(12) United States Patent
Noffsinger et al.

(10) Patent No.: US 8,626,366 B2
(45) Date of Patent: Jan. 7, 2014

(54) SYSTEM AND METHOD FOR CONTROLLING A MARINE VESSEL THROUGH A WATERWAY

(75) Inventors: Joseph Forrest Noffsinger, Grain Valley, MO (US); Paul Kenneth Houpt, Niskayuna, NY (US); Jared Cooper, Melbourne, FL (US); Mason Samuels, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/417,801

(22) Filed: Mar. 12, 2012

(65) Prior Publication Data

US 2012/0277941 A1 Nov. 1, 2012

Related U.S. Application Data

(63) Continuation-in-part of application No. 12/345,073, filed on Dec. 29, 2008, now Pat. No. 8,155,811.

(51) Int. Cl.
*B60L 3/00* (2006.01)
*B60L 15/00* (2006.01)
*G05D 1/00* (2006.01)

(52) U.S. Cl.
USPC .......................................... 701/21; 701/123

(58) Field of Classification Search
USPC ................. 701/21, 23–26, 41, 123, 410, 411; 440/12.5
See application file for complete search history.

(56) References Cited

U.S. PATENT DOCUMENTS

| | | | |
|---|---|---|---|
| 2007/0219683 A1* | 9/2007 | Daum et al. ..................... 701/19 |
| 2007/0225878 A1* | 9/2007 | Kumar et al. ................... 701/19 |
| 2007/0233364 A1* | 10/2007 | Kumar ......................... 701/200 |
| 2008/0183345 A1* | 7/2008 | Chandra et al. ................. 701/19 |
| 2008/0201028 A1* | 8/2008 | Brooks et al. ................... 701/20 |

\* cited by examiner

*Primary Examiner* — Mary Cheung
(74) *Attorney, Agent, or Firm* — GE Global Patent Operation; John A. Kramer

(57) ABSTRACT

A system for controlling a marine vessel includes a processor, a propulsion system, and a directional system. The processor is disposed onboard the marine vessel and obtains a trip plan that includes designated operational settings of the marine vessel for a trip along a waterway. The propulsion system is communicatively coupled with the processor and generates propulsion to move the marine vessel according to the designated operational settings of the trip plan. The directional system is communicatively coupled with the processor and steers the marine vessel according to the designated operational settings of the trip plan. Operating the propulsion system and the directional system according to the designated operational settings of the trip plan reduces at least one of fuel consumed or emissions generated by the marine vessel relative to the marine vessel being propelled or steered according to one or more plans other than the trip plan.

26 Claims, 13 Drawing Sheets

SYSTEM AND METHOD FOR CONTROLLING A MARINE VESSEL THROUGH A WATERWAY

CROSS-REFERENCE TO RELATED APPLICATIONS

This application is a continuation-in-part of U.S. patent application Ser. No. 12/345,073, which was filed on 29 Dec. 2008 and is entitled "System And Method For Optimizing A Path For A Marine Vessel Through A Waterway" (the "'073 Application"). The entire disclosure of the '073 Application is incorporated by reference.

BACKGROUND

The subject matter described herein generally relates to marine vessels, and more particularly, to a system and method for controlling a marine vessel through a waterway.

Operation of a marine vessel through a waterway, such as moving a marine vessel from an initial location to a final location along the waterway, may involve consideration of numerous factors, which increases the difficulty and risk of the operation. For example, such factors as the presence of fixed or moving obstacles within the waterway, and/or dimensions of the waterway (e.g., width), can increase the difficulty and risk of maneuvering the marine vessel within the waterway from the initial location to the final location. Additionally, others factors relating to the waterway may have limited foreseeability and yet have a significant impact on the operation of the marine vessel, such as weather conditions, water current, wind current, and/or other marine vessels which may suddenly obstruct a path of travel, and thus further complicate manual operation of the marine vessel from the initial location to the final location within the waterway. Also, at the final location, if the marine vessel is to be docked at a docking station, the maneuvering and/or turning of the marine vessel may involve highly complex calculations that require an operator with the significant skill, who may not be available, or the marine vessel may not be capable of being manually maneuvered by an operator of any skill level.

Thus, it would be advantageous to provide a system which provides for control of a marine vessel through a waterway from an initial location to a final location, while taking into consideration such factors as the dimensions of the waterway, for example.

BRIEF DESCRIPTION

One embodiment of the inventive subject matter described herein provides a system for controlling a marine vessel for travel through a waterway. The term "waterway" refers to any body of water. For example, the system may be used to optimize a path (also referred to as a route) for the marine vessel along the waterway, from a first location to a second location. As used herein, the term "optimize" (and the various forms thereof) means to improve something relative to another technique, system, process, or method. For example, optimizing a path may mean determining a path to follow that reduces fuel consumption, reduces emissions generated, and/or reduces a travel time of the marine vessel to a destination location relative to the marine vessel traveling along another, different path. The term optimize (and the various forms thereof) may not involve maximizing or minimizing one or more quantities. For example, optimizing the path that a marine vessel is to follow may mean that the path that is followed reduces fuel consumed, emissions generated, and/or travel time relative to traveling along one or more other paths, but not relative to all other potential paths. Alternatively, optimizing the path may mean that the path that is followed does reduce fuel consumed, emissions generated, and/or travel time relative to all other paths. The first location of the path may be, for example, an initial location of the marine vessel (such as the ingress to the waterway) or a current location of the marine vessel, and the second location may be a final location of the marine vessel, such as at a dock or other docking station, or an intermediate location between the initial or current location and a final destination. The system includes a processor having a memory, which stores at least one operating parameter of the marine vessel, and navigational data of the waterway. ("Operating parameter" refers to an aspect of the marine vessel as relating to its propulsion through water, including, but not limited to, vessel mass, drag and other hydrodynamic aspects, and/or propulsion power characteristics.) Additionally, the system includes a propulsion system and a directional system on the marine vessel, where the propulsion system and directional system are coupled to the processor and respectively impart a selective propulsion force on the marine vessel at a selective direction based on a respectively received propulsion command and direction command from the processor. For example, based on a propulsion command received from the processor, the propulsion system may impart a selective propulsion force on the marine vessel. The direction of the propulsion force can be governed by the directional system, based on a direction command received from the processor. "Selective" refers to a particular selected/designated propulsion force or direction, as applicable. The processor determines a designated (e.g., optimal) path for the marine vessel to travel along through the waterway from the first location to the second location. The processor also determines the propulsion command and the direction command to be transmitted to the propulsion and directional system at a respective incremental location along the designated path. The designated path, propulsion command, and direction command are determined so as to optimize a performance characteristic of the marine vessel along the designated path, similar to as described above. The determination of the designated path, the propulsion command, and/or the direction command is based on the first location, the second location, the at least one operating parameter, the performance characteristic, and/or the navigational data. As should be appreciated, "incremental" can refer to one of a plurality of successive locations along the designated path. The processor can determine a propulsion command and a direction command at each successive location for optimizing (e.g., improving but not necessarily maximizing or minimizing) the performance characteristic of the marine vessel along the designated path or route. "Performance characteristic" refers to a designated aspect of the marine vessel's travel along the path, such as travel time, fuel or energy efficiency, arrival time at a waypoint (or destination location or other location), or the like.

Another embodiment of the presently described inventive subject matter provides a system for controlling a combination of marine vessels through a waterway. For example, the system may be used to optimize a path for the combination of vessels through the waterway from a first location (e.g., an initial or current location) to a second location (e.g., a final or intermediate location). The system includes a processor, and a respective propulsion system and a respective directional system on the vessels, which are coupled to the processor and configured to respectively impart a selective propulsion force on the respective vessel at a selective direction based on a respectively received propulsion command and direction command from the processor. For example, the system may include one or more processors that communicate with a first propulsion system and a first directional system on a first marine vessel and that communicate with a second propulsion system and a second directional system on a second marine vessel. The processor determines a respective designated (e.g., optimal) path for the vessels to travel along through the waterway from the first location to the second location, a respective propulsion command, and a respective direction command to be transmitted to the propulsion systems of the vessels and the directional systems of the vessels at one or more incremental locations along the designated path, so to optimize a performance characteristic of one or more of the vessels along the designated path. In one embodiment, the designated path may include a first path for a first vessel of the combination of vessels, a different, second path for a second vessel of the combination of the vessels, and so on. The determination of the designated path, the propulsion commands, and the direction commands can be based on the first location, the second location, at least one respective operating parameter of the vessels, the performance characteristic, and/or a navigational data of the waterway.

Another embodiment of the presently described inventive subject matter provides a method for controlling a marine vessel through a waterway, such as for optimizing a path for the marine vessel through the waterway from a first location (e.g., an initial or current location) to a second location (e.g., a final or intermediate location). The method includes determining an optimal or designated path for the marine vessel through the waterway from the first location to the second location. Additionally, the method includes determining a propulsion command to be transmitted to a propulsion system of the marine vessel and a direction command to be transmitted to a directional system of the marine vessel at one or more incremental locations along the designated path. The designated path, the propulsion command, and/or the direction command are determined for optimizing (e.g., increasing or decreasing) a designated performance characteristic of the marine vessel along the path, and can be determined based on the first location, the second location, the performance characteristic, at least one operating parameter of the marine vessel, and/or navigational data of the waterway.

In another embodiment, a system (e.g., a system for controlling a marine vessel) includes a processor, a propulsion system, and a directional system. The processor is configured to be disposed onboard a marine vessel and to obtain a trip plan that includes designated operational settings of the marine vessel for a trip along a waterway. The propulsion system of the marine vessel is configured to be communicatively coupled with the processor and to generate propulsion to move the marine vessel according to the designated operational settings of the trip plan. The directional system of the marine vessel is configured to be communicatively coupled with the processor and to steer the marine vessel according to the designated operational settings of the trip plan. The propulsion system propelling the marine vessel and the directional system steering the marine vessel according to the designated operational settings of the trip plan reduces at least one of fuel consumed or emissions generated by the marine vessel relative to the marine vessel being propelled or steered according to one or more plans other than the trip plan.

In another embodiment, another method (e.g., for controlling a marine vessel) is provided. The method includes obtaining a trip plan that includes designated operational settings of a marine vessel for a trip along a waterway, autonomously controlling a propulsion system of the marine vessel to generate propulsion to move the marine vessel according to the designated operational settings of the trip plan, and autonomously controlling a directional system of the marine vessel to steer the marine vessel according to the designated operational settings of the trip plan. The propulsion system propelling the marine vessel and the directional system steering the marine vessel according to the designated operational settings of the trip plan reduces at least one of fuel consumed or emissions generated by the marine vessel relative to the marine vessel being propelled or steered according to one or more plans other than the trip plan.

In another embodiment, another system (e.g., for controlling a marine vessel combination of a first marine vessel and a second marine vessel) includes a processor. The processor is configured to be disposed onboard the marine vessel combination of the first marine vessel that is coupled with the second marine vessel. The processor is configured to determine a trip plan for the marine vessel combination that includes a designated path for the marine vessel combination through a waterway and designated operational settings of the marine vessel combination expressed as a function of at least one of time or distance along the path. The designated path and the designated operational settings are determined by the processor to at least one of reduce fuel consumed, reduce emissions generated, increase energy efficiency, reduce a transit time, or decrease an arrival time at one or more locations along the designated path by the marine vessel combination relative to traveling along the waterway according to one or more plans other than the trip plan.

BRIEF DESCRIPTION OF THE DRAWINGS

A more particular description of the inventive subject matter briefly described above will be rendered by reference to specific embodiments thereof that are illustrated in the appended drawings. Understanding that these drawings depict one or more embodiments of the inventive subject matter and are not therefore to be considered to be limiting of the scope of all embodiments of the inventive subject matter. Example embodiments of the inventive subject matter will be described and explained with additional specificity and detail through the use of the accompanying drawings in which.

DETAILED DESCRIPTION

Figure 1:
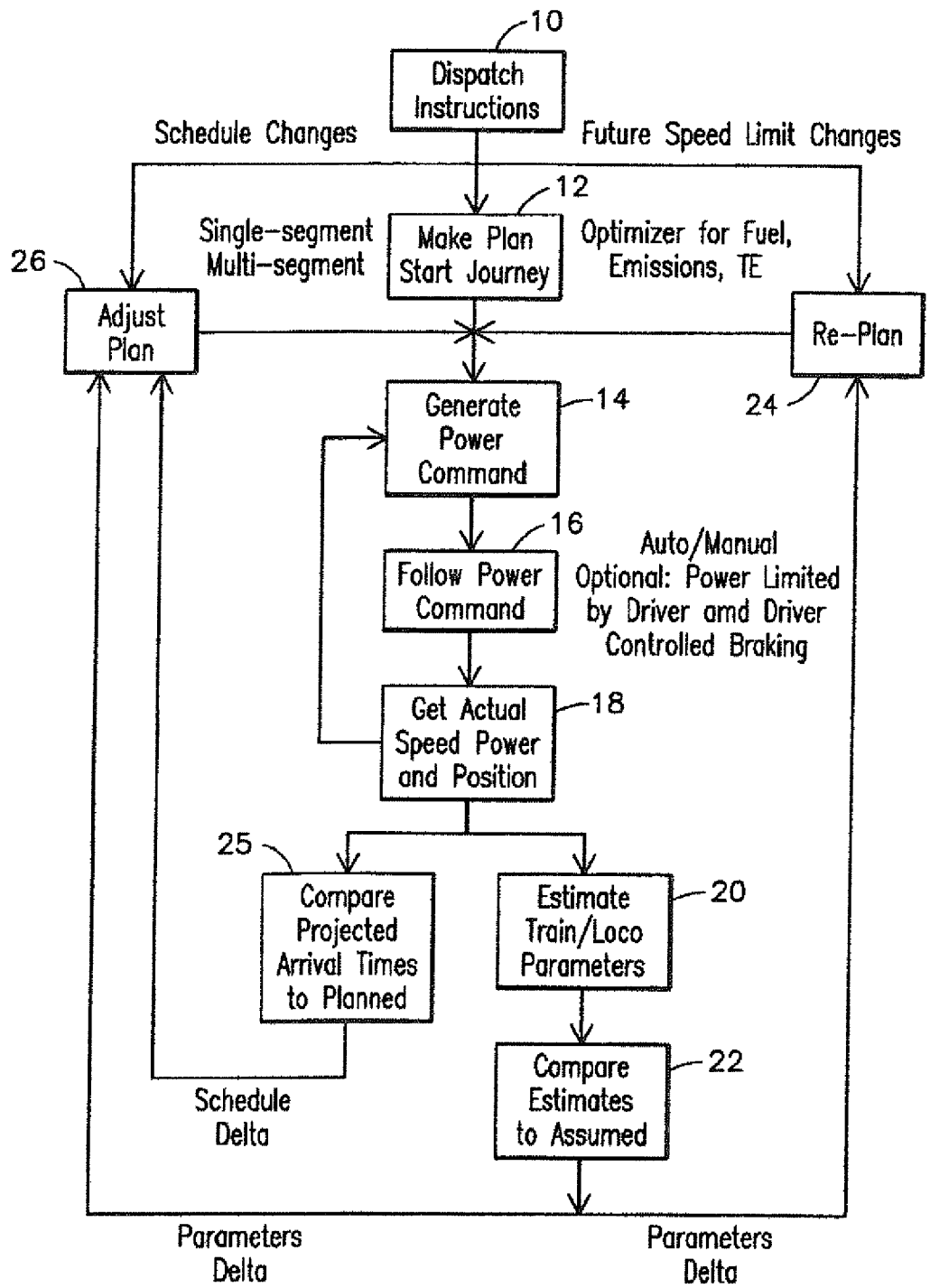
FIG. 1 depicts a flow chart of one embodiment of a method for controlling a marine vessel or other powered system.

Reference will now be made in detail to the embodiments consistent with the inventive subject matter described herein, examples of which are illustrated in the accompanying drawings. Wherever possible, the same reference numerals used throughout the drawings refer to the same or like parts.

At least one embodiment of the inventive subject matter described herein provides a system, method, and/or computer implemented method for determining and implementing a propulsion strategy or other mission plan of a powered system such as a train, marine vessel, other vehicle, or other powered system, including determining an approach to monitor and control operations of the powered system to improve certain objective operating criteria or parameter requirements, while satisfying schedule and speed constraints, for example. At least one embodiment can be operable in distributed power (DP) operations, such as a situation where two or more powered systems are controlled in concert for carrying out a designated mission. An apparatus, such as a data processing system, including a computer processor (CPU), memory, input/output devices (I/O), program storage, a connecting bus, and other appropriate components, could be programmed or otherwise designed to facilitate the practice of one or more methods or systems described herein. Such a system could include appropriate software for executing one or ore methods described herein. Although specific embodiments of the presently described inventive subject matter relate to a system, method, and/or computer implemented method for controlling a marine vessel through a waterway (which may include determining and implementing an optimized path of the marine vessel through the waterway), one or more embodiments described herein may be applicable to another powered system for carrying out a mission.

Also, an article of manufacture, such as a pre-recorded disk or other similar computer program product, for use with a data processing system, could include a storage medium and software recorded thereon for directing the data processing system to facilitate the practice of one or more embodiments of the methods described herein. Such apparatus and articles of manufacture also fall within the spirit and scope of the inventive subject matter described herein.

Broadly speaking, one or more embodiments of the inventive subject matter provide a method, system, and program for controlling a marine vessel through a waterway, including determining and implementing an optimized (e.g., designated) path for the marine vessel through the waterway, and further including determining an approach to monitor and control a marine vessel's operations to improve certain objective operating criteria parameter requirements while satisfying schedule and/or speed constraints. To facilitate an understanding of the presently described inventive subject matter, it is described hereinafter with reference to specific, non-limiting implementations thereof. The inventive subject matter is described in the general context of computer-executable instructions, such as program modules, being executed by a computer. Generally, program modules include routines, programs, objects, components, data structures, etc., that perform particular tasks or implement particular abstract data types. For example, the software programs that underlie the inventive subject matter can be coded in different languages, for use with different platforms. In the description that follows, examples of the inventive subject matter are described in the context of a web portal that employs a web browser. It will be appreciated, however, that the principles that underlie the inventive subject matter can be implemented with other types of computer software technologies as well. In addition to a marine vessel, including a combination of marine vessels organized as a consist (e.g., a designated group of marine vessels), the inventive subject matter may be applicable to other powered systems.

Moreover, one or more aspects of the inventive subject matter may be practiced with other computer system configurations, including hand-held devices, multiprocessor systems, microprocessor-based or programmable consumer electronics, minicomputers, mainframe computers, and the like. The inventive subject matter may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the marine vessel or other powered system, or adjacent marine vessels in a consist, or off-board in wayside or central offices where wireless communication is used.

As used herein, the term "consist" may refer to one or more marine vessels or other powered marine vessels in succession, connected together so as to provide motoring (propulsion) and/or braking (e.g., deceleration) capability. The powered marine vessels may be connected together where no non-powered marine vessels are in between the powered marine vessels. The series of linked or connected marine vessels (referred to herein as a "vehicle train," and including an embodiment where a vehicle train comprises a single marine vessel) can have more than one consist in its composition. Specifically, there can be a lead consist, and more than one remote consists, such as midway in the line of marine vessels and another remote consist at the end of the vehicle train. Each consist may have a first powered marine vessel and trail powered marine vessel(s). Though a consist is usually viewed as successive powered marine vessels, a consist group of powered marine vessels may also be recognized as a consist even when at least a non-powered marine vessel separates the powered marine vessels, such as when the consist is configured for distributed power operation, wherein throttle and braking commands are relayed from the lead powered marine vessel to the remote trails by a radio link or physical cable. Toward this end, the term "consist" should not be considered a limiting factor when discussing multiple powered marine vessels within the same vehicle train. The term "consist" is applicable to any powered marine vessel or other powered system.

Referring now to the drawings, one or more embodiments of the inventive subject matter are described herein. The inventive subject matter can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the inventive subject matter are discussed below.

FIG. 1 is a flow chart of a method for planning a trip or other mission for a powered system (e.g., marine vessel or other powered vehicle), according to an example embodiment of the presently described inventive subject matter. As illustrated, instructions are input specific to planning a trip either on board or from a remote location, such as a dispatch center 10. Such input information includes, but is not limited to: marine vessel position; consist description (such as marine vessel models); marine vessel power description; performance of a marine vessel propulsion system (e.g., in the case of a marine vessel, propellers); consumption of engine fuel as a function of output power; cooling characteristics; the intended trip route; the vehicle train (e.g., series of linked marine vessels and possibly non-powered boats) represented by marine vessel makeup and loading together with effective drag coefficients; trip desired parameters including, but not limited to, start time and location, end location, desired travel time, crew (user and/or operator) identification, crew shift expiration time, and route; and the like.

This data may be provided to a vehicle 42, 204 (shown in FIGS. 3 and 11) in a number of ways, such as, but not limited to, an operator manually entering this data into the vehicle 42, 204 via an onboard display, inserting a memory device such as a "hard card" and/or USB drive containing the data into a receptacle aboard the vehicle 42, 204, and transmitting the information via wireless communication from a central or wayside location 41, 257 (shown in FIGS. 3 and 11), such as a track (or other route) signaling device and/or a wayside device, to the vehicle 42, 204. Although the vehicle 42 is shown as a rail vehicle in FIG. 3, the vehicle may be a marine vessel. Load characteristics (e.g., drag) of the vehicle 42, 204 and/or vehicle train 31 (e.g., a group of connected marine vessels 204) may change over the route (e.g., with altitude, ambient temperature, condition of the route and marine vessels, weather conditions, currents, and the like), and the plan may be updated to reflect such changes as needed by any of the methods discussed above and/or by real-time autonomous collection of marine vessel/vehicle train conditions. This includes, for example, changes in marine vessel or vehicle train characteristics detected by monitoring equipment on or off board the vehicle(s) 42, 204.

The signal system determines the allowable speed of the vehicle 42, 204 (shown in FIGS. 3 and 11) or vehicle train. There may be many types of route signal systems and operating rules associated with each of the signals. For example, some signals have a single light (on/off), some signals have a single lens with multiple colors, and some signals have multiple lights and colors. These signals can indicate that the route is clear and the vehicle 42, 204 may proceed at max allowable speed. They can also indicate a reduced speed or stop is required. This reduced speed may need to be achieved immediately, or at a certain location (e.g., prior to the next signal or crossing). In a marine context, route signals or wayside devices may include signaling buoys, navigational beacons (e.g., channel markers), lighthouses, or the like.

The signal status is communicated to the vehicle train (or single marine vessel or other powered vehicle) and/or operator through various means. In the case of a rail vehicle, some systems have circuits in the track and inductive pick-up coils on the rail cars. Other systems have wireless communications systems. Signal systems can also require the operator to visually inspect the signal and take the appropriate actions.

The signaling system may interface with an on-board signal system 300 (shown in FIG. 3) and adjust the vehicle speed according to the inputs and the appropriate operating rules. For signal systems that involve the operator visually inspecting the signal status, the operator screen can present the appropriate signal options for the operator to enter based on the location of the marine vessel. The type of signal systems and operating rules, as a function of location, may be stored in an onboard database 35, 63 (shown in FIGS. 3 and 7).

Based on the specification data that is input into the system 300 (shown in FIG. 3), an optimal plan which reduces or minimizes fuel use and/or emissions produced subject to speed limit constraints along the route with desired start and end times is computed to produce a trip profile 12 (also referred to as a mission plan, mission profile, trip plan, trip profile, or driving trajectory). The trip plan includes designated speed and power (e.g., throttle) settings that the vehicle train (or marine vessel or other powered vehicle) is to follow, expressed as a function of distance and/or time along a path or route, and such marine vessel/vehicle train operating limits, including but not limited to, upper limits on throttle power and/or brake settings, speed limits as a function of location, the expected fuel used and emissions generated, and the like. In one embodiment, the values for the throttle setting are selected to obtain throttle change decisions about once every 10 to 30 seconds. Alternatively, the throttle change decisions may occur at faster or shorter frequencies, if needed and/or desired to follow a designated speed profile (e.g., designated speeds of the marine vessel that are expressed as a function of at least one of time during a trip and/or distance along a route). In another embodiment, the trip plan can provide power settings for the vehicle train, either at the entire vehicle train level, consist level, and/or individual marine vessel level. Power settings comprise braking power settings, motoring power settings, and/or airbrake power settings. In another embodiment, instead of operating at discrete (e.g., integer value) throttle power settings, one or more non-discrete, or continuous (e.g., non-integer or decimal), power settings may be designated by the trip plan. Thus, for example, if a trip plan specifies a throttle setting of 6.8, instead of operating at throttle setting 7, the marine vessel 204 (shown in FIG. 11) or other vehicle 42 (shown in FIG. 3) can operate at 6.8 (or at another value or setting). Allowing such intermediate power settings may bring additional efficiency benefits to operation of the vehicles 42, 204.

The procedure used to compute the trip plan can include one or more methods for computing a power sequence (e.g., designated throttle, power, and/or brake settings) that drive the vehicle 42, 204 (shown in FIGS. 3 and 11) and/or the vehicle train 31 (shown in FIG. 3) to reduce fuel consumption and/or emissions generated subject to marine vessel (or other powered vehicle) operating and schedule constraints. In some cases, the designated trip plan may be the same or similar to one or more previously determined trip plans due to similarities of the marine vessel configuration, vehicle train configuration, route, and/or environmental conditions. In these cases, it may be sufficient to look up a previously designated trip plan (such as a driving trajectory) within the database 36, 63 (shown in FIGS. 3 and 7) based on the similar configurations, routes, and/or conditions, and attempt to follow the trip plan during a current trip. When a previously computed trip plan or profile is unavailable, one or more methods to compute a new trip plan include, but are not limited to, direct calculation of the trip plan using differential equation models which can approximate physics of motion of the marine vessel and/or vehicle train. The setup can involve selection of a quantitative objective function, such as a weighted sum (integral) of model variables that correspond to rate of fuel consumption and/or emissions generated and, in some embodiments, adding a term to penalize excessive throttle variation.

An optimal control formulation can be set up to reduce the quantitative objective function subject to constraints that include, but are not limited to, speed limits, lower limits on throttle, power, and/or brake settings, upper limits on throttle, power, and/or brake settings, and the like. Depending on planning objectives for a trip (e.g., a scheduled departure time, scheduled arrival time, limits on emission generation, limits on fuel consumption, scheduled cargo unloading times at a destination dock, and the like), the formulation of the trip plan may be flexibly implemented to reduce fuel consumption and/or emission generation subject to constraints on emissions and/or speed limits, subject to constraints on fuel use and arrival time. It is also possible to implement, for example, a goal of the trip plan to reduce the total travel time to a destination or intermediate location without constraints on total emissions generated or fuel consumed where such relaxation of constraints would be permitted or required for completion of the mission.

Mathematically, a problem to be solved by forming the trip plan may be stated by a physics model that can be expressed by one or more quantitative objective functions, such as:

$$\frac{dx}{dt} = v; x(0) = 0.0; x(T_f) = D \quad \text{(Eqn. 1)}$$

$$\frac{dv}{dt} = T_e(u, v) - G_a(x) - R(v); v(0) - 0.0; v(T_f) = 0.0 \quad \text{(Eq. 2)}$$

where x represents a position or location of the marine vessel or vehicle train, v represents a velocity of the marine vessel or vehicle train, and t represents time and/or distance along a route of a trip (which may be expressed in miles, kilometers, minutes, hours, and the like, as appropriate), and u represents an operational setting (e.g., notch or throttle setting) or command input. Further, D represents a distance to be traveled by the marine vessel or vehicle train, $T_f$ represents a desired or scheduled arrival time at distance D along the route, $T_e$ represents the tractive effort produced by the marine vessel or vehicle train, $G_a$ represents a gravitational drag of the marine vessel or vehicle train which can depend on a length (or other size) of the marine vessel or vehicle train, vehicle train makeup, and/or terrain on which the marine vessel or vehicle train is located, and R represents a net speed dependent drag of the marine vessel or vehicle train combination. Initial and/or final speeds can also be specified at one or more locations along the trip. In one embodiment, the initial and final speeds are set to be zero (e.g., where the marine vessel or vehicle train is stopped at the beginning and the end of the trip). Finally, the model used to generate the trip plan can be modified to include other movement dynamics of the marine vessel or vehicle train, such a lag between a change in a throttle setting and actual implementation of the change in the throttle setting (e.g., represented by u), and/or resulting tractive effort (e.g., propulsion) or braking. Using such a model, an optimal control formulation (e.g., a trip plan) is established to reduce one or more of the quantitative objective functions subject to constraints that may include, but are not limited to, speed limits, lower limits on power (e.g., throttle) settings, upper limits on power settings, and the like. Depending on planning objectives, the problem of generating the trip plan may be flexibly set up to reduce fuel consumed subject to constraints on emissions generation and/or speed limits, and/or to reduce emissions, subject to constraints on fuel use and/or arrival time.

A trip plan may be generated to implement a goal of reducing a total travel time to one or more locations without constraints on emissions generated and/or fuel consumed, where such relaxation of constraints is permitted or required to complete the mission (e.g., trip). One or more of these performance measures can be expressed as a linear combination of one or more of the following functions:

$$\min_{u(t)} \int_0^{T_f} F(u(t))dt \text{ - reduce total fuel consumed} \quad \text{(Eqn. 3)}$$

$$\min_{u(t)} T_f \text{ - reduce travel time to one or more locations of the trip} \quad \text{(Eqn. 4)}$$

$$\min_{u_i} \sum_{i=2}^{n_d} (u_i - u_{i-1})^2 \text{ - reduce notch or throttle jockeying} \quad \text{(Eqn. 5)}$$

(e.g., changing) for discrete (e.g., integer) throttle settings $$\min_{u(t)} \int_0^{T_f} (du/dt)^2 dt \text{ - reduce notch or throttle jockeying} \quad \text{(Eqn. 6)}$$

for continuous (e.g., non-integer) throttle settings

In one embodiment, the fuel term F in Equation 3 may be replaced with a term corresponding to emissions production. For example, for reduction of emissions generated during a trip, the following function may be used:

$$\min_{u(t)} \int_0^{T_f} E(u(t))dt \text{ - reduce emissions generated} \quad \text{(Eqn. 7)}$$

In Equation 7, E represents a quantity of emissions generated in gm/hphr for one or more of the notch or other throttle settings. Additionally, a reduction can be achieved based on a weighted total of fuel and emissions.

A objective function that can be used for formation of a trip plan can include a combination of one or more of the above functions:

$$\min_{u(t)} \alpha_1 \int_0^{T_f} F(u(t))\,dt + \alpha_3 T_f + \alpha_2 \int_0^{T_f} (du/dt)^2 dt \qquad \text{(OP)}$$

The coefficients of the above linear combination may depend on the relative importance or weight given to the terms. Note that in Equation (OP), u(t) represents an optimizing variable, such as a continuous throttle position. If a discrete throttle is used, such as for older vehicles and certain marine vessels and other powered vehicles, the solution to Equation (OP) may be discretized, which may result in less fuel saving. Finding a reduced time solution (e.g., $\alpha_1$ and $\alpha_2$ being set to zero) can be used to find a lower bound for an achievable travel time of the trip (e.g., $T_f = T_{fmin}$). In this case, both u(t) and $T_f$ can be optimizing variables. In one embodiment, Equation (OP) is solved for various values of $T_f$ with $\alpha_3$ set to zero. Constraints such as the speed limits along the path may be adjoined, such as according to:

$$0 \leq v - SL(x) \qquad \text{(Eqn. 8)}$$

or when using reduced travel time as the objective of the trip plan and that an end point constraint is held or applied (e.g., the total fuel consumed is less than the amount of fuel in the tank of the marine vessel) may be expressed using:

$$0 < \int_0^{T_f} F(u(t))\,dt \leq W_F \qquad \text{(Eqn. 9)}$$

where $W_F$ represents the fuel remaining in the tank of the marine vessel at a time $T_f$. Alternatively, the objective equation (OP) can be expressed in other forms. The expressions presented above are examples for use in accordance with one embodiment of the presently described inventive subject matter.

Reference to emissions in the context of one or more embodiments described herein may refer to cumulative emissions produced in the form of oxides of nitrogen (NOx), unburned hydrocarbons, and/or particulates. For example, in the context of locomotives, the locomotives may be compliant to Environmental Protection Agency (EPA) standards for brake-specific emissions, and thus when emissions are optimized in accordance with one or more embodiments of the presently described inventive subject matter, the reduced emissions may be mission total emissions today. (This may also be applicable to other powered marine vessels.) During a trip, operations of the marine vessel may be held to be compliant with EPA mandates. If an objective during a trip or mission is to reduce emissions, the objective equation that is used to form the trip plan may be amended to consider the objective. One flexibility or variable in the setup of the trip plan is that one or more of the objectives of the trip can vary by geographic region or mission. For example, for a high priority marine vessel (relative to one or more other marine vessels), a reduced travel time may be the governing objective (relative to other objectives) on one route because the marine vessel is high priority traffic. In another example, emission output may vary from state to state (or other geographic regions) along the planned trip route.

In one embodiment, a dynamic optimal control problem (e.g., controlling the marine vessel to reduce fuel consumed and/or emissions generated) in the time domain to an equivalent static mathematical programming problem with N decision variables, where the number "N" can depend on a frequency at which throttle and/or braking adjustments are made and/or the duration or distance of the trip. This N can be in the thousands. Utilizing one or more embodiments of the presently described inventive subject matter, an example 7.6% savings in fuel consumed may be realized when a marine vessel travels according to a trip plan determined and followed using one or more embodiments described herein when compared to an actual manually controlled throttle/speed history where the trip was determined by an operator. The improved savings may be realized because the optimization realized because traveling according to a trip plan can produce a driving strategy with both less drag loss and/or little or no braking loss when compared to manual control of the marine vessel.

Figure 2:
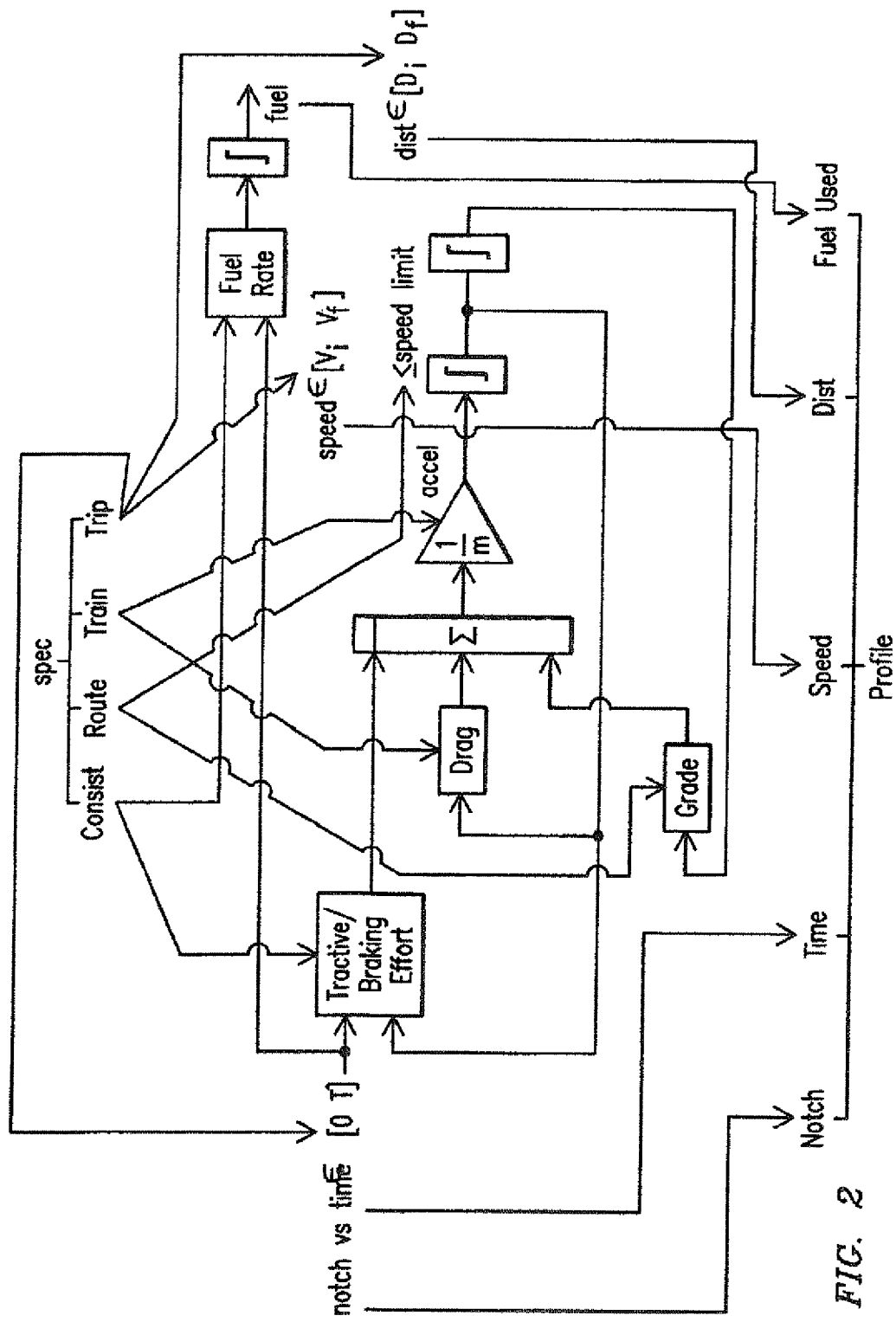
FIG. 2 depicts a simplified model of a train, marine vessel, or other powered system that may be employed as part of the method/system described herein.

In one embodiment, to make the optimization described above computationally tractable, a model of the marine vessel train may be employed, such as illustrated in FIG. 2 and the equations discussed above. One possible refinement to the trip profile or plan is produced by driving a more detailed model with a power sequence for operation of the marine vessel being generated, to test if other thermal, electrical, and/or mechanical constraints are violated by operation of the marine vessel according to the trip plan. This can lead to a modified trip profile or plan that designates alternate operational settings of the marine vessel that is closer to a trip that can be achieved without harming marine vessel or vehicle train equipment, such as by satisfying additional implied constraints such thermal and electrical limits on the marine vessels and inter-vehicle forces in the vehicle train.

Referring back to FIG. 1, once the trip is started 12, operational settings of the marine vessel, such as power commands, are generated 14 to put the plan in motion. Depending on the operational set-up of the marine vessel, one command is for a marine vessel or other powered marine vessel to follow the power command 16 so as to achieve a speed that is designated by the trip plan. In one embodiment, one or more sensors or other devices obtain actual operational conditions of the marine vessel, such as the actual speed and/or actual power output of the marine vessel or vehicle consist. Owing to one or more approximations in the models used for the optimization and/or one or more other reasons, a closed-loop calculation of corrections to optimized power can be obtained to track the desired optimal speed. For example, the actual operational conditions of the marine vessel can be monitored and compared to the operational settings of the marine vessel that are designated by the trip plan. Differences between the actual operating conditions and the designated operational settings can be identified and corrections or changes to the operational settings of the marine vessel can be determined. For example, if the marine vessel is traveling at a slower speed than is designated by the trip plan, increases in throttle settings can be determined as corrections to operation of the marine vessel. Such corrections can be made automatically or by the operator. As one example, the marine vessel can operate in a "coaching mode," where one or more systems onboard the marine vessel generate instructions that are communicated to the operator (e.g., on a display or other output device) in order to direct the operator how to manually control the marine vessel according to the trip plan.

In some cases, the model used to generate the trip plan may significantly differ from the actual marine vessel. This can occur for one or more reasons, including but not limited to, extra cargo pickups or setouts, marine vessels that fail in route, errors in the database 36, 63 (shown in FIGS. 3 and 7), or data entry by the operator. A monitoring system can be in place that uses real-time vehicle train data (e.g., actual operational conditions of the marine vessel, such as actual speed, power output, intra-vehicle forces, emissions output, and the like) to estimate marine vessel and/or vehicle train parameters in real time 20. The estimated parameters are then compared to the assumed parameters that are used when the trip was created 22. Based on differences between the assumed and estimated values, the trip may be re-planned 24, should large enough savings accrue from a new plan. For example, if the trip plan was created based on a first vehicle mass and/or size but, for one or more reasons, the marine vessel has a lower, second vehicle mass and/or a smaller size (e.g., the marine vessel includes less cargo and/or fewer power generating units in the marine vessel), then the trip plan may be modified based on the lower mass and/or size. Other vehicle parameters and/or other parameters may be considered, such as the wind drag on the vehicle, power output of the vehicle (e.g., due to decreased health or output from the vehicle), adverse weather conditions, adverse route conditions (e.g., stronger or swifter currents in a waterway), and the like.

Other reasons a trip may be re-planned include directives from a remote location, such as dispatch and/or the operator requesting a change in objectives of the trip plan (e.g., a scheduled arrival time at one or more locations) to be consistent with more global movement planning objectives. Additional global movement planning objectives may include, but are not limited to, other vehicle train schedules, allowing exhaust to dissipate from an area such as a tunnel or beneath a bridge when a marine vehicle travels below the bridge, maintenance operations, and the like. Another reason may be due to an onboard failure of a component. Strategies for re-planning may be grouped into incremental and major adjustments depending on the severity of the disruption, as discussed in more detail below. In general, a "new" plan may be derived from a solution to the optimization problem equation (OP) described above, or one or more faster approximate solutions can be found, as described herein.

In operation, the marine vessel 204 (shown in FIG. 11) or other powered vehicle 42 (shown in FIG. 3) monitors (e.g., continuously, periodically, and/or when prompted) system efficiency and update the trip plan based on the actual efficiency that is measured when such an update would improve vehicle performance. Re-planning computations may be carried out entirely within the marine vessel(s) or fully or partially moved to a remote location, such as dispatch or wayside processing facilities where wireless technology is used to communicate the plans to the vehicle 42, 204. In one embodiment, efficiency trends of the vehicle 42, 204 can be used to develop vehicle fleet data regarding efficiency transfer functions. The fleet-wide data may be used when determining a first or initial trip plan, and may be used for network-wide optimization tradeoff when considering locations of a plurality of vehicle trains. For example, the travel-time fuel use tradeoff curve as illustrated in FIG. 4 reflects a capability of a vehicle train on a particular route or waterway at a current time, updated from ensemble averages collected for many similar vehicles or marine vessels on the same route or waterway. Thus, a central dispatch facility collecting curves like FIG. 4 from many vehicles 42, 204 could use that information to better coordinate overall vehicle movements to achieve a system-wide advantage in fuel use or throughput.

Many events in daily operations can lead to a need to generate or modify a currently executing plan, where it is desired to keep the same trip objectives. For example, when a vehicle train is behind schedule for planned movement event (e.g., a meet or pass with another vehicle) and the late vehicle needs to make up time. Using the actual speed, power, and location of the vehicle 42, 204 (shown in FIGS. 3 and 11), a comparison can be made between a planned arrival time and a currently estimated (e.g., predicted) arrival time at 25. Based on a difference in the times, and/or differences in parameters of the vehicle 42, 204 and/or route (e.g., as detected or changed by dispatch or the operator), the trip plan can be adjusted at 26. This adjustment may be made automatically according to a vehicle owner's desire for how such departures from plan should be handled, or alternatives may be manually proposed for the on-board operator and dispatcher to jointly decide how to get the vehicle 42, 204 traveling back on the trip plan. For example, one or more adjustments may be presented (e.g., shown on a display or other output device) to the operator and the operator may manually select one or more of the adjustments (e.g., using a keypad, keyboard, touchscreen, or other input device). When a trip plan is updated but where the original objectives (such as but not limited to arrival time) remain the same, additional changes may be factored in concurrently, e.g., new future speed limit changes, which could affect the feasibility of ever recovering the original plan. In such instances, if the original trip plan cannot be maintained, or in other words the vehicle train is unable to meet the original trip plan objectives, as discussed herein other trip plan(s) may be presented to the operator and/or remote facility, or dispatch.

A re-plan may also be made when it is desired to change the original objectives. Such re-planning can be done at either fixed preplanned times, manually at the discretion of the operator or dispatcher, or autonomously when predefined limits, such as vehicle train operating limits, are exceeded. For example, if the current plan execution is running late by more than a specified threshold, such as thirty minutes, the trip plan can be re-planned to accommodate the delay at the expense of increased fuel use and/or emissions generation, as described above, or to alert the operator and dispatcher how much of the time can be made up at all (e.g., what time remains to be traveled to a designated location even when the vehicle travels at speed limits of the route or the fuel that can be saved within a time constraint). Other triggers for re-plan can also be envisioned based on fuel consumed or the health of the vehicle 42, 204 and/or consist, including but not limited time of arrival, loss of horsepower due to equipment failure and/or equipment temporary malfunction (such as operating too hot or too cold), and/or detection of gross setup errors, such as in the assumed vehicle train load. That is, if the change reflects impairment in the vehicle performance for the current trip, these may be factored into the models and/or equations used in the optimization of the trip plan.

Changes in plan objectives can also arise from a need to coordinate events where the trip plan for one vehicle 42, 204 (shown in FIGS. 3 and 11) may compromise the ability of another vehicle 42, 204 to meet objectives and arbitration at a different level, e.g., the dispatch office is required. For example, in the case of a rail vehicle, the coordination of meets and passes may be further optimized through train-to-train communications. Thus, as an example, if a train knows that it is behind schedule in reaching a location for a meet and/or pass, communications from the other train can notify the late train (and/or dispatch). The operator can then enter information pertaining to being late into the system 300 (shown in FIG. 3), which recalculates the trip plan of the train. The system 300 also can be used at a high level, or network-level, to allow a dispatch to determine which vehicle 42, 204 should slow down or speed up should a scheduled meet and/or pass time constraint may not be met. As discussed herein, this can be accomplished by vehicles 42, 204 transmitting data to the dispatch to prioritize how each vehicle 42, 204 should change its planning objective. A choice could be based on either schedule or fuel saving benefits, depending on the situation.

For any of the manually or automatically initiated re-plans, the system 300 may present more than one trip plan to the operator. In an example embodiment, the system 300 presents different trip plans to the operator, allowing the operator to select the arrival time and understand the corresponding fuel and/or emission impact of the different trip plans. Such information can also be provided to the dispatch for similar consideration, either as a simple list of alternatives or as a plurality of tradeoff curves, such as those illustrated in FIG. 5.

One or more embodiments of the system 300 may have the ability to learn and adapt to changes in the vehicle train and power consist which can be incorporated either in the current plan and/or in future plans. For example, one of the triggers for initiating a re-plan can be a loss of horsepower generated by the vehicle. When building up horsepower over time, either after a loss of horsepower or when beginning a trip, transition logic can be utilized to determine when desired horsepower is achieved. This information can be saved in the vehicle database 36, 63 (shown in FIGS. 3 and 7) for use in optimizing either future trips or the current trip should loss of horsepower occur again.

Figure 3:
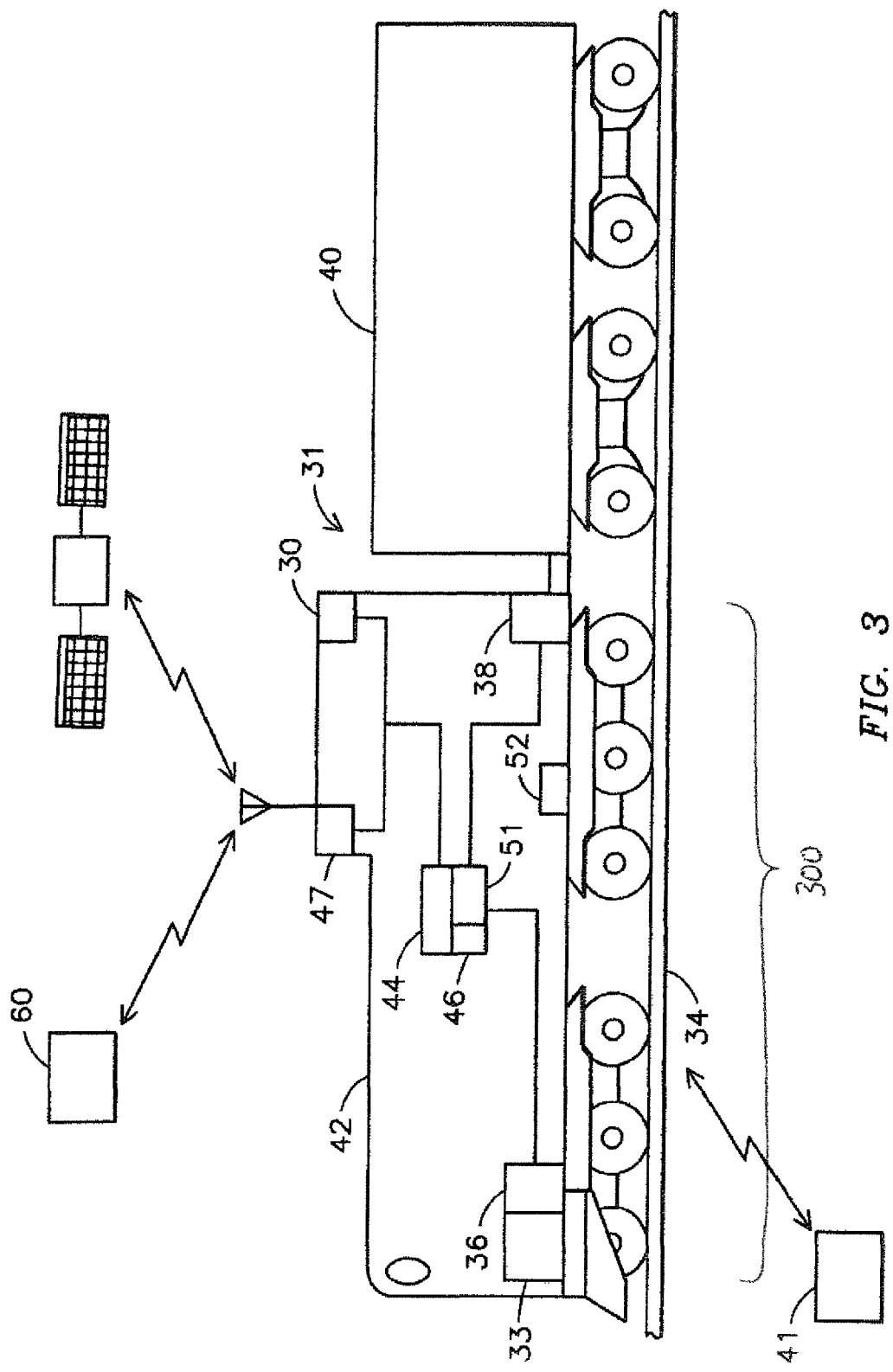
FIG. 3 is a schematic diagram of various elements in one embodiment of a system for controlling a marine vessel or other powered system.
Figure 4:
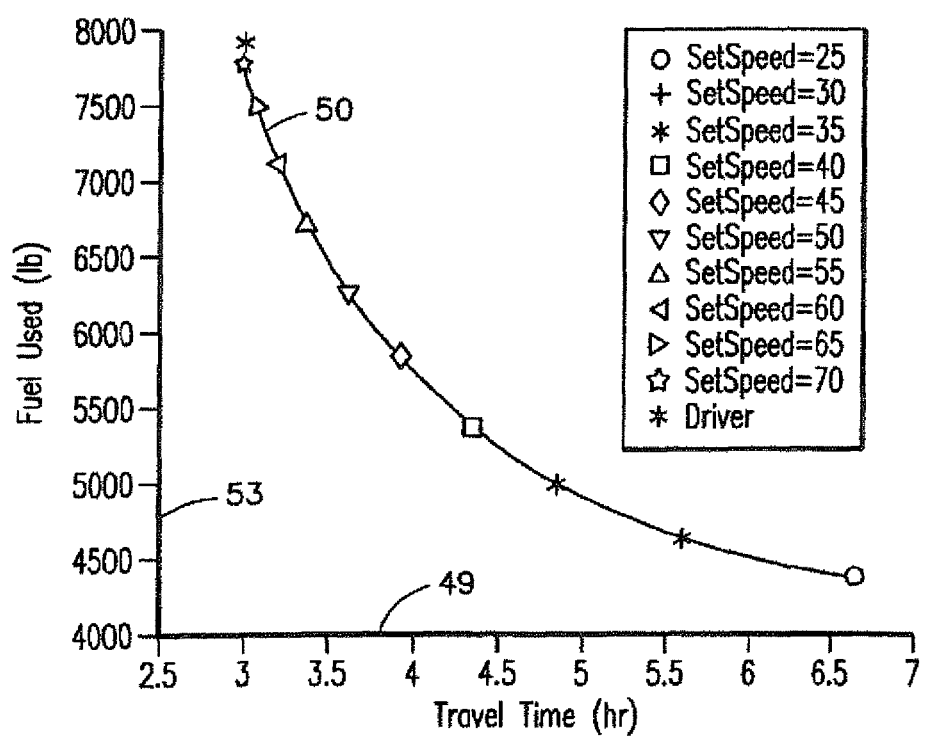
FIG. 4 depicts an example embodiment of a fuel-use/travel time curve.

FIG. 3 depicts various elements that may be part of a trip (or other mission) optimizer system 300, according to one embodiment. Although the system 300 is shown as being disposed onboard a rail vehicle 42, alternatively, the system 300 may be disposed onboard a marine vessel 204 (shown in FIG. 11). A locator element 30 determines a location of the vehicle 42, 204 or vehicle train 31. The locator element 30 can be a GPS sensor, or a system of sensors, that determines a location of the vehicle 42, 204 or vehicle train 31. Examples of such other systems may include, but are not limited to, wayside devices, such as radio frequency automatic equipment identification (RF AEI) tags, dispatch, and/or video determination. Another system may include the tachometer(s) onboard the vehicle 42, 204 and distance calculations from a reference point. A wireless communication system 47 may also be provided to allow for communications between vehicles and/or with a remote location, such as dispatch. Information about travel locations may also be transferred from other vehicles or vehicle trains.

A route characterization element 33 provides information about a route, such as a path through a waterway. The information about the route can include water speed or flow (e.g., currents, tides or tidal patterns), weather conditions, depth of the water at various locations, and the like. The route characterization element 33 may include an on-board route integrity database 36. Sensors 38 are used to measure a tractive effort 40 being hauled by the vehicle 42, 204, throttle settings of the vehicle 42, 204, configuration information of the vehicle 42, 204, speed of the vehicle 42, 204, individual marine vessel or other vehicle configuration, individual marine vessel or other powered vehicle capability, and the like. In one embodiment, the configuration information may be loaded without the use of a sensor 38, but is input in another manner as discussed above. Furthermore, the health of the vehicles in the consist may also be considered. For example, if one vehicle in the consist is unable to operate above a particular throttle setting, this information is used when creating or re-planning the trip plan.

Information from the locator element 30 may also be used to determine an appropriate arrival time of the vehicle 42, 204 or vehicle train 31. For example, if there is a vehicle 42, 204 or vehicle train 31 moving along a route 34 (although shown as a track, the route 34 alternatively may represent a path along a waterway) toward a destination and no vehicle or vehicle train is following behind it, and the vehicle 42, 204 or vehicle train has no fixed arrival deadline to adhere to, the locator element 30, including but not limited to RF AEI tags, dispatch, and/or video determination, may be used to gage the location of the vehicle 42, 204 or vehicle train 31. Furthermore, inputs from signaling systems may be used to adjust the speed of the vehicle 42, 204 or vehicle train 31. Using the on-board route database, discussed below, and the locator element, such as GPS, the system 300 can adjust an operator interface (e.g., a display device) to reflect the signaling system state at the location of the vehicle 42, 204 or vehicle train 31. In a situation where signal states would indicate restrictive speeds ahead, the system 300 may elect to slow the vehicle 42, 204 or vehicle train 31 to conserve fuel consumption.

Information from the locator element 30 may also be used to change planning objectives as a function of distance to destination. For example, owing to inevitable uncertainties about congestion along the route 34, "faster" time objectives on the early part of a route may be employed as a hedge against delays that statistically occur later. If it happens on a particular trip that delays do not occur, the objectives on a latter part of the trip can be modified to exploit the built-in slack time that was banked earlier, and thereby recover some fuel efficiency. A similar strategy could be invoked with respect to emissions restrictive objectives, e.g., approaching an urban area or typically heavily congested section of a waterway (e.g., a shipping port or bay that includes a shipping port).

As an example of the hedging strategy, in the case of a rail vehicle, if a trip is planned from New York to Chicago, the system 300 may have an option to operate the vehicle 42, 204 slower at the beginning, middle, or end of the trip. The system 300 can create the trip plan to allow for slower operation at the end of the trip since unknown constraints, such as but not limited to weather conditions, route maintenance, and the like, may develop and become known during the trip. As another consideration, if traditionally congested areas are known, the trip plan can be developed with an option to have more flexibility around these traditionally congested regions. Therefore, the system 300 also may consider weighting/penalty as a function of time/distance into the future and/or based on known/past experience. The planning and re-planning can take into consideration weather conditions, route conditions, other vehicles on the route, and the like, and may be taken into consideration at any time during the trip for the trip plan to be adjusted accordingly.

FIG. 3 further discloses other elements that may be part of the system 300. A processor or control unit 44 receives information from the locator element 30, route characterizing element 33, and/or sensors 38. An algorithm 46 (which may represent a tangible computer readable storage medium having one or more sets of programs/instructions that direct the processor 44 to perform one or more functions) operates within the processor 44 or causes the processor 44 to operate. The algorithm 46 can e used to compute the trip plan based on parameters involving the marine vessel 204 (shown in FIG. 11) or other powered vehicle 42, vehicle train 31, route 34, and/or objectives of a mission (e.g., a trip), as described above. In an example embodiment, the trip plan is established based on models for vehicle train behavior as the vehicle 42, 204 and/or the vehicle train 31 moves along the route 34 as a solution of non-linear differential equations derived from physics with simplifying assumptions that are provided in the algorithm. The algorithm 46 can have access to the information from the locator element 30, route characterizing element 33, and/or sensors 38 to create a trip plan that reduces or minimizes fuel consumption and/or emissions generation of the vehicle 42, 204 and/or vehicle train 31, causes the vehicle 42, 204 and/or vehicle train 31 to arrive at a destination location at a designated time, and/or ensures proper crew operating time aboard the vehicle 42, 204 and/or vehicle train 31. In one embodiment, a driver or operator, and/or controller element, 51, is also provided. As discussed herein, the controller element 51 is used for controlling the vehicle 42, 204 and/or vehicle train 31 as the vehicle 42, 204 and/or vehicle train 31 follows the trip plan. In an example embodiment, discussed further herein, the controller element 51 makes operating decisions autonomously. In another example embodiment, the operator may be involved with directing the vehicle 42, 204 and/or vehicle train 31 to follow the trip plan. For example, as described above, instructions may be presented to the operator in a "coaching mode" to direct the operator how to control the vehicle 42, 204 and/or vehicle train 31.

A feature of one embodiment of the system 300 is the ability to initially create and quickly modify "on the fly" a trip plan that is being executed. This includes creating the initial trip plan when a long distance is involved, owing to the complexity of the plan optimization algorithm. When a total length of a trip plan exceeds a given or designated distance, the algorithm 46 may segment the mission or trip, such as by dividing the mission or trip by waypoints, landmarks, and the like. Though only a single algorithm 46 is discussed, more than one algorithm may be used (or the same algorithm may be executed a plurality of times) wherein the algorithms may be connected together. The waypoints or landmarks may include natural locations where the vehicle 42, 204 or vehicle train 31 stops, for example, in the case of rail vehicles, sidings where a meet with opposing traffic (or pass with a train behind the current train) is scheduled to occur on a single-track rail, or at yard sidings or industry where cars are to be picked up and set out, and locations of planned work. At such waypoints, the vehicle train 31 may be required to be at the location at a scheduled time and be stopped or moving with speed in a specified range. The time duration from arrival to departure at waypoints is called "dwell time."

In an example embodiment, the trip optimizer system 300 breaks down a longer trip into smaller segments in a systematic way. Each segment can be somewhat arbitrary in length, but is typically picked at a natural location such as a stop or significant speed restriction, or at mileposts that define junctions with other routes. Given a partition, or segment, selected in this way, a driving profile (e.g., a portion of a trip plan) is created for each segment of route as a function of travel time taken as an independent variable, such as shown in FIG. 4. The fuel used/travel-time tradeoff associated with each segment can be computed prior to the vehicle 42, 204 or vehicle train 31 reaching that segment of route. A total trip plan can be created from the driving profiles created for the various segments. The system 300 can distribute a total travel time for the trip amongst the segments of the trip in such a way so that the total trip time is satisfied (e.g., the vehicle 42, 204 is set to operate to arrive at a destination at a scheduled arrival time) and/or total fuel consumed or emissions generated over the segments is reduced. An exemplary 3-segment trip is disclosed in FIG. 6 and discussed below. In another embodiment, the trip plan may comprise a single segment representing the entire trip.

FIG. 4 depicts an example embodiment of a fuel-use/travel time curve 50. As mentioned previously, such a curve 50 can be created when calculating a trip profile or plan for various travel times for each segment of a longer, overall trip. For a given travel time 51, an amount of fuel used or consumed 52 can be the result of a trip profile that is computed as described above. Once travel times for the various segments of the trip are allocated among the segments, a trip plan (e.g., that specifies power, brake, and/or speed settings for the vehicle 42, 204 as a function of time and/or distance) is determined for each segment, and may be determined from previously computed solutions. If there are waypoint constraints on speed between the segments, such as, but not limited to, a change in a speed limit, these constraints can be matched up during creation of the trip plan. If speed restrictions change within a single segment, the fuel use/travel-time curve 50 can be re-computed for the segment that includes the change. This reduces time for having to re-calculate more parts, or segments, of the trip. If the vehicle 42, 204 or vehicle train 31 changes significantly along the route 34, e.g., from loss of a powered vehicle or pickup or set-out of cars (non-powered vehicles), then driving profiles for subsequent segments of the trip may be recomputed, thereby creating new instances of the curve 50. These new curves 50 would then be used along with new schedule objectives to plan the remaining trip.

Once a trip plan is created as discussed above, a trajectory of speed and power versus distance can be used to reach a destination with reduced fuel use and/or emissions generated at the required trip time. The fuel consumed and/or emissions generated by the vehicle 42, 204 and/or vehicle train 31 may be reduced relative to the vehicle 42, 204 and/or vehicle train 31 traveling along the same route 34 according to another plan, such as a plan that includes one or more different operational settings of the vehicle 42, 204 and/or vehicle train 31 at one or more locations along the trip. There are several ways in which to execute the trip plan. As provided below in more detail, in one example embodiment, when in an operator "coaching mode," information is displayed to the operator for the operator to follow to achieve the operational settings (e.g., power and/or speeds) designated by the trip plan. In this mode, the operating information includes suggested operating conditions that the operator should use. In another example embodiment, acceleration and maintaining a constant speed are autonomously performed. However, when the vehicle 42, 204 and/or vehicle train 31 is to be slowed according to the trip plan, the operator can be responsible for applying a braking system 52. In another embodiment, commands for powering and braking are provided as required to follow the desired speed-distance path of the trip plan. In another embodiment, the controller 51 may generate control signals that are communicated to the propulsion and/or braking systems of the vehicle 42, 204 and/or vehicle train 31 in order to automatically cause the vehicle 42, 204 and/or vehicle train 31 to operate according to the operational settings designated by the trip plan. Alternatively, the controller 51 may generate the control signals for communication to an output device (e.g., a display) located onboard the vehicle 42, 204 and/or vehicle train 31. The output device may present instructions to the operator on how to manually control the operational settings of the vehicle 42, 204 and/or vehicle train 31 based on the trip plan.

Feedback control strategies can be used to provide corrections to the operational settings designated by the profile to correct for events such as, but not limited to, vehicle load variations caused by fluctuating head winds, tail winds, and/or changing currents in the waterway. Other corrections can be used to account for an error in vehicle parameters, such as, but not limited to, actual vehicle mass and/or drag, when compared to the assumed or designated mass and/or drag used to create the trip plan. Other corrections may be provided to correct information contained in the route database 36. Another possible error may involve un-modeled performance differences due to the marine vessel (or other powered vehicle) engine, traction motor thermal duration, and/or other factors. Feedback control strategies can compare the actual speed (or other operational condition) as a function of position and/or time to the designated speed (or other operational setting) in the designated trip plan. Based on differences between the actual operational condition(s) and the designated operational setting(s), one or more corrections to the trip plan can be made to drive the actual velocity (or other actual operational condition) toward the designated velocity (or other designated operational setting) of the trip plan. To ensure stable regulation, a compensation algorithm may be provided which filters the feedback speeds into power corrections so that closed-performance stability is ensured. Compensation may include standard dynamic compensation to meet performance objectives.

In one embodiment, to determine a fuel-optimal trip from point "A" to point "B" where there are stops along the way, and for updating the trip for the remainder of the trip once the trip has begun, a sub-optimal decomposition method is usable for finding an optimal trip plan. Using modeling methods, the computation method can find the trip plan with a specified travel time and initial and final speeds, so as to satisfy the speed limits and vehicle capability constraints when there are stops. Though the following discussion is directed towards optimizing (e.g., reducing) fuel use, it can also be applied to optimize other factors, such as, but not limited to, emissions, schedule, crew comfort, and load impact. The method may be used at the outset in developing a trip plan and/or adapting to changes in objectives after initiating a trip.

Figure 5:
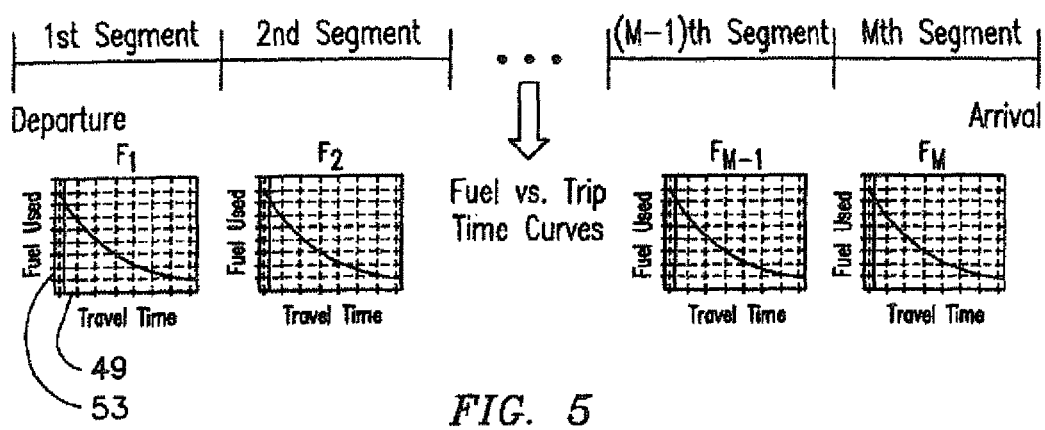
FIG. 5 depicts an example embodiment of segmentation decomposition for trip planning.
Figure 6:
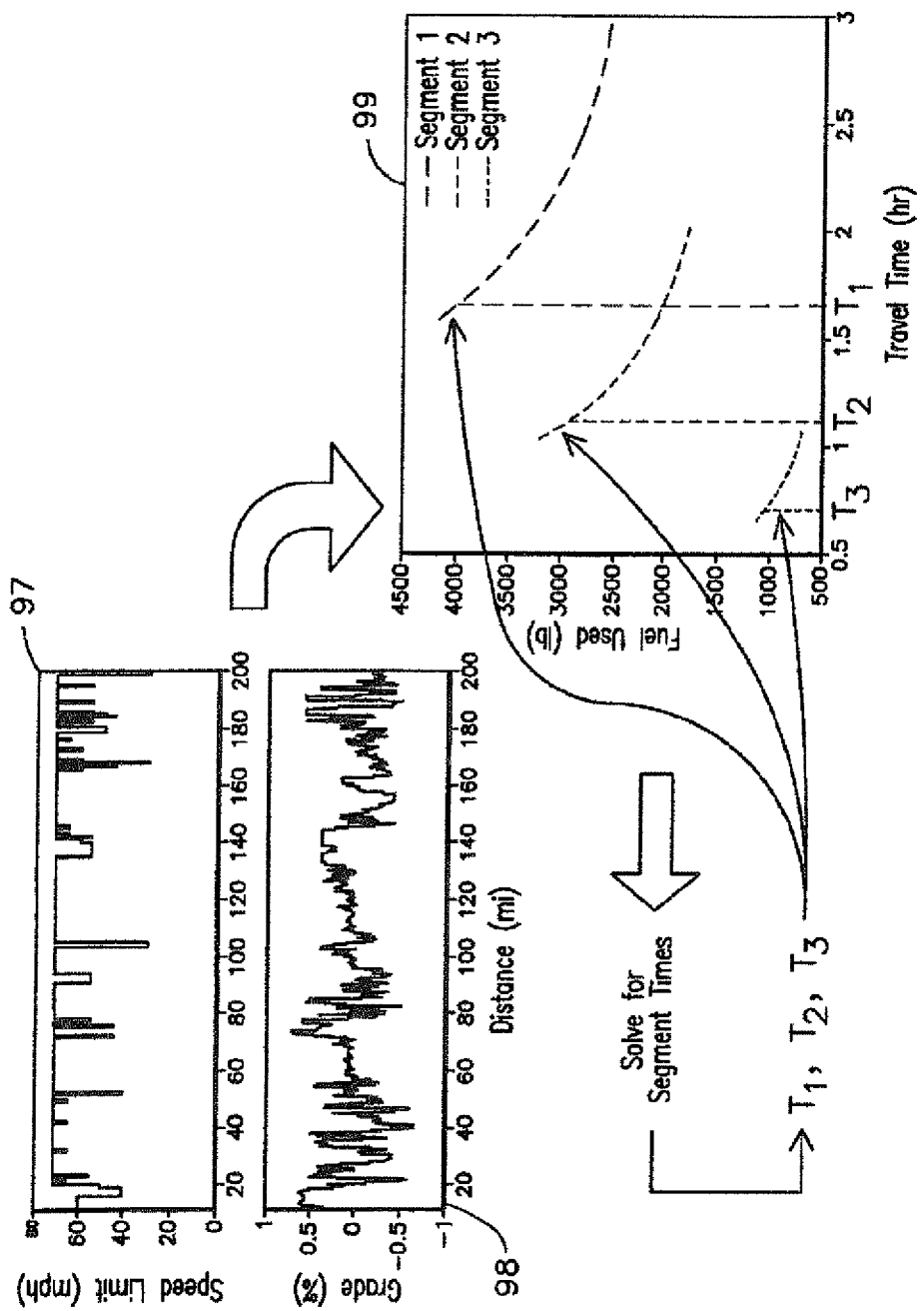
FIG. 6 depicts an example embodiment of a segmentation example.

As discussed herein, one or more embodiments of the inventive subject matter may employ a setup as illustrated in the flow chart depicted in FIG. 5, and as an exemplary 3-segment example depicted in detail in FIG. 6. As illustrated, the trip may be broken into two or more segments, T1, T2, and T3. (As noted above, it is possible to consider the trip as a single segment.) As discussed herein, the segment boundaries may not result in equal segments. Instead, the segments may use natural or mission specific boundaries. Optimal trip plans are pre-computed for each segment. If fuel use versus trip time is the trip object to be met, fuel versus trip time curves are built for each segment. As discussed herein, the curves may be based on other factors, wherein the factors are objectives to be met with a trip plan. When trip time is the parameter being determined, trip time for each segment is computed while satisfying the overall trip time constraints. FIG. 6 illustrates speed limits 97 for an example 3-segment 200-mile (321.9 kilometers) trip. Further illustrated are grade changes 98 over the 200-mile (321.9 kilometers) trip. A combined chart 99 illustrating curves for each segment of the trip of fuel used over the travel time is also shown.

Using the optimal control setup described previously and the computation methods described herein, the trip optimizer system 300 can generate the trip plan with specified travel time and initial and final speeds, so as to satisfy the speed limits and vehicle capability constraints when there are stops. Though the following detailed discussion is directed toward reducing fuel use, it can also be applied to optimize other factors as discussed herein, such as, but not limited to, emissions. A key flexibility is to accommodate desired dwell time at stops and to consider constraints on earliest arrival and departure at a location as may be required, for example, in single-route operations where the time to be in or get by a siding (or other designated area such as an intersecting waterway) is critical.

One or more embodiments of the trip optimizer system 300 find a fuel-optimal trip from distance $D_0$ to $D_M$, traveled in time T, with M−1 intermediate stops at $D_1, \ldots, D_{M-1}$, and with the arrival and departure times at these stops constrained by:

$$t_{min}(i) \leq t_{arr}(D_i) \leq t_{max}(i) - \Delta t_i \quad \text{(Eqn. 10)}$$

$$t_{arr}(D_i) + \Delta t_i \leq t_{dep}(D_i) \leq t_{max}(i) \; i=1,\ldots,M-1 \quad \text{(Eqn. 11)}$$

where $t_{arr}(D_i)$, $t_{dep}(D_i)$, and $\Delta t_i$ are the arrival, departure, and minimum stop time at the ith stop, respectively. Assuming that fuel-optimality implies minimizing ore reducing stop time, therefore $t_{dep}(D_i)=t_{arr}(D_i)+\Delta t_i$ which eliminates the second inequality above. Suppose for each i=1, . . . , M, the fuel-optimal trip from $D_{i-1}$ to $D_i$ for travel time t, $T_{min}(i) \leq t \leq T_{max}(i)$, is known. Let $F_i(t)$ be the fuel-use corresponding to this trip. If the travel time from $D_{j-1}$ to $D_j$ is denoted $T_j$, then the arrival time at $D_i$ is given by:

$$t_{arr}(D_i) = \sum_{j=1}^{i}(T_j + \Delta t_{j-1}) \quad \text{(Eqn. 12)}$$

where $\Delta t_0$ is defined to be zero. The fuel-optimal trip from $D_0$ to $D_M$ for travel time T is then obtained by finding $T_i$, j=1, . . . , M, which minimize or reduce:

$$\sum_{i=1}^{M} F_i(T_i) T_{min}(i) \leq T_i \leq T_{max}(i) \quad \text{(Eqn. 13)}$$

subject to:

$$t_{min}(i) \leq \sum_{j=1}^{i}(T_j + \Delta t_{j-1}) \leq t_{max}(i) - \Delta t_i \; i=1,\ldots,M-1 \quad \text{(Eqn. 14)}$$

$$\sum_{j=1}^{M}(T_j + \Delta t_{j-1}) = T \quad \text{(Eqn. 15)}$$

Once a trip is underway, the issue is re-determining the fuel-optimal solution for the remainder of a trip (originally from $D_0$ to $D_M$ in time T) as the trip is traveled, but where disturbances preclude following the fuel-optimal solution. Let the current distance and speed be x and v, respectively, where $D_{i-1} \leq x \leq D_i$. Also, let the current time since the beginning of the trip be tact. Then the fuel-optimal solution for the remainder of the trip from x to $D_M$, which retains the original arrival time at $D_M$, is obtained by finding $\tilde{T}_i$, $T_j$, j=i+1, . . . M, which minimize or reduce:

$$\tilde{F}_i(\tilde{T}_i, x, v) + \sum_{j=i+1}^{M} F_j(T_j) \quad \text{(Eqn. 16)}$$

subject to:

$$t_{min}(i) \leq t_{act} + \tilde{T}_i \leq t_{max}(i) - \Delta t_i \quad \text{(Eqn. 17)}$$

$$t_{min}(k) \leq t_{act} + \tilde{T}_i + \sum_{j=i+1}^{k}(T_j + \Delta t_{j-1}) \leq t_{max}(k) - \Delta t_k \quad \text{(Eqn. 18)}$$

$$k = i+1, \ldots, M-1 \quad \text{(Eqn. 19)}$$

$$t_{act} + \tilde{T}_i + \sum_{j=i+1}^{M} (T_j + \Delta t_{j-1}) = T \quad \text{(Eqn. 20)}$$

Here, $\tilde{F}_i(t,x,v)$ is the fuel-used of the optimal trip from x to $D_i$, traveled in time t, with initial speed at x of v.

As discussed above, one example way to enable more efficient re-planning is to construct the optimal solution for a stop-to-stop trip from partitioned segments. For the trip from $D_{i-1}$ to $D_i$, with travel time $T_i$, choose a set of intermediate points $D_{ij}$, j=1, . . . , $N_i$–1. Let $D_{i0}=D_{i-1}$ and $D_{iN_i}=D_i$. Then express the fuel-use for the optimal trip from $D_{i-1}$ to $D_i$ as:

$$F_i(t) = \sum_{j=1}^{N_i} f_{ij}(t_{ij} - t_{i,j-1}, v_{i,j-1}, v_{ij}) \quad \text{(Eqn. 21)}$$

where $f_{ij}(t, v_{i,j-1}, v_{ij})$ is the fuel-use for the optimal trip from $D_{i,j-1}$ to $D_{ij}$, traveled in time t, with initial and final speeds of $v_{i,j-1}$ and $v_{ij}$. Furthermore, $t_{ij}$ is the time in the optimal trip corresponding to distance $D_{ij}$. By definition, $t_{iN_i}-t_{i0}=T_i$, since the vehicle is stopped at $D_{i0}$ and $D_{iN_i}$, $v_{i0}=v_{iN_i}=0$.

The above expression enables the function $F_i(t)$ to be alternatively determined by first determining the functions $f_{ij}(\bullet)$, $1 \le j \le N_i$, then finding $\tau_{ij}$, $1 \le j \le N_i$ and $v_{ij}$, $1 \le j < N_i$, which minimize or reduce:

$$F_i(t) = \sum_{j=1}^{N_i} f_{ij}(\tau_{ij}, v_{i,j-1}, v_{ij}) \quad \text{(Eqn. 22)}$$

subject to:

$$\sum_{j=1}^{N_i} \tau_{ij} = T_i \quad \text{(Eqn. 23)}$$

$$v_{min}(i, j) \le v_{ij} \le v_{max}(i, j) \quad j = 1, \ldots, N_i - 1 \quad \text{(Eqn. 24)}$$

$$v_{i0} = v_{iN_i} = 0 \quad \text{(Eqn. 25)}$$

By choosing $D_{ij}$ (e.g., at speed restrictions or meeting points), $v_{max}(i, j)-v_{min}(i, j)$ can be minimized or reduced, thus minimizing or reducing the domain over which $f_{ij}(\ )$ needs to be known.

Based on the partitioning above, a simpler suboptimal re-planning approach than that described above is to restrict re-planning to times when the vehicle train is at distance points $D_{ij}$, $1 \le i \le M$, $1 \le j \le N_i$. At point $D_{ij}$, the new optimal trip from $D_{ij}$ to $D_M$ can be determined by finding $\tau_{ik}$, $j < k \le N_i$, $v_{ik}$, $j < k < N_i$, and $\tau_{mn}$, $i < m \le M$, $1 \le n \le N_m$, $v_{mn}$, $i < m \le M$, $1 \le n < N_m$, which minimize or reduce:

$$\sum_{k=j+1}^{N_i} f_{ik}(\tau_{ik}, v_{i,k-1}, v_{ik}) + \sum_{m=i+1}^{M} \sum_{n=1}^{N_m} f_{mn}(\tau_{mn}, v_{m,n-1}, v_{mn}) \quad \text{(Eqn. 26)}$$

subject to:

$$t_{min}(i) \le t_{act} + \sum_{k=j+1}^{N_i} \tau_{ik} \le t_{max}(i) - \Delta t_i \quad \text{(Eqn. 27)}$$

$$t_{min}(n) \le t_{act} + \sum_{k=j+1}^{N_i} \tau_{ik} + \sum_{m=i+1}^{n} (T_m + \Delta t_{m-1}) \le t_{max}(n) - \Delta t_n \quad \text{(Eqn. 28)}$$

$$n = i+1, \ldots, M-1 \quad \text{(Eqn. 29)}$$

$$t_{act} + \sum_{k=j+1}^{N_i} \tau_{ik} + \sum_{m=i+1}^{M} (T_m + \Delta t_{m-1}) = T \quad \text{(Eqn. 30)}$$

where:

$$T_m = \sum_{n=1}^{N_m} \tau_{mn} \quad \text{(Eqn. 31)}$$

A further simplification is obtained by waiting on the re-computation of $T_m$, i<m≤M, until distance point $D_i$ is reached. In this way, at points $D_{ij}$ between $D_{i-1}$ and $D_i$, the minimization or reduction above needs only be performed over $\tau_{ik}$, $j < k \le N_i$, $v_{ik}$, $j < k < N_i$. $T_i$ is increased as needed to accommodate any longer actual travel time from $D_{i-1}$ to $D_{ij}$ than planned. This increase is later compensated, if possible, by the re-computation of $T_m$, i<m≤M, at distance point $D_i$.

With respect to the closed-loop configuration disclosed above, the total input energy required to move a vehicle 42, 204 and/or vehicle train 31 from point A to point B consists of the sum of four components, specifically, difference in kinetic energy between points A and B; difference in potential energy between points A and B; energy loss due to friction and other drag losses; and energy dissipated by the application of brakes (or other braking or deceleration function). Assuming the start and end speeds to be equal (e.g., stationary), the first component is zero. Furthermore, the second component is independent of driving strategy. Thus, it suffices to minimize or reduce the sum of the last two components.

Following a constant speed profile can minimize or reduce drag loss. Following a constant speed profile also can minimize or reduce total energy input when braking is not needed to maintain a constant speed. However, if braking is required to maintain constant speed, applying braking just to maintain constant speed may increase a total required energy because of the need to replenish the energy dissipated by the brakes. A possibility exists that some braking may actually reduce total energy usage if the additional brake loss is more than offset by the resultant decrease in drag loss caused by braking, by reducing speed variation.

After completing a re-plan from the collection of events described above, the new optimal notch/speed plan (e.g., a trip plan) can be followed using the closed loop control described herein. However, in some situations there may not be enough time to carry out the segment decomposed planning described above, and particularly when there are critical speed restrictions that must be respected, an alternative is needed. In one embodiment, a smart cruise control algorithm (e.g., the algorithm 46) can provide an efficient way to generate, on the fly, an energy-efficient (hence fuel-efficient) sub-optimal prescription for driving the vehicle 42, 204 and/or vehicle train 31 over a known route 34. This algorithm 46 may assume knowledge of the position of the vehicle 42, 204 and/or vehicle train 31 along the route 34 at one or more, or all, times, as well as knowledge of the grade and curvature of the route 34 (or other characteristics of the route, such as current speed and direction of water flow) versus position along the route 34. The method may rely on a point-mass model for the motion of the vehicle 42, 204 and/or vehicle train 31, whose parameters may be adaptively estimated from online measurements of vehicle 42, 204 motion as described earlier.

The smart cruise control algorithm has several components, such as, in one embodiment, a module for generating a modified speed limit profile that serves as an energy-efficient guide around speed limit reductions; a module for generating a throttle or dynamic brake setting profile that attempts to balance between minimizing or reducing speed variation and braking; a module or mechanism for combining the latter two components to produce a notch (or other throttle) command; and/or a module employing a feedback loop to compensate for mismatches of modeled parameters or designated operational settings when compared to reality parameters or actual operational conditions. The algorithm can accommodate strategies do no active braking (e.g., the driver is signaled and assumed to provide the requisite braking) or a variant that does active braking.

With respect to the cruise control algorithm that does not control dynamic braking, the example components can include a module for generating a modified speed limit profile that serves as an energy-efficient guide around speed limit reductions, a notification module for generating a notification signal that notifies the operator when braking should be applied, a module for creating a throttle profile that attempts to balance between minimizing or reducing speed variations and notifying the operator to apply braking, a mechanism or module employing a feedback loop to compensate for mismatches of model parameters to reality parameters, and the like.

Also included in the trip optimizer system 300 is an approach to identify parameter values of the vehicle 42, 204 and/or vehicle train 31. For example, with respect to estimating mass of the vehicle 42, 204 and/or vehicle train 31, a Kalman filter and a recursive least-squares approach may be utilized to detect errors that may develop over time.

Figure 7:
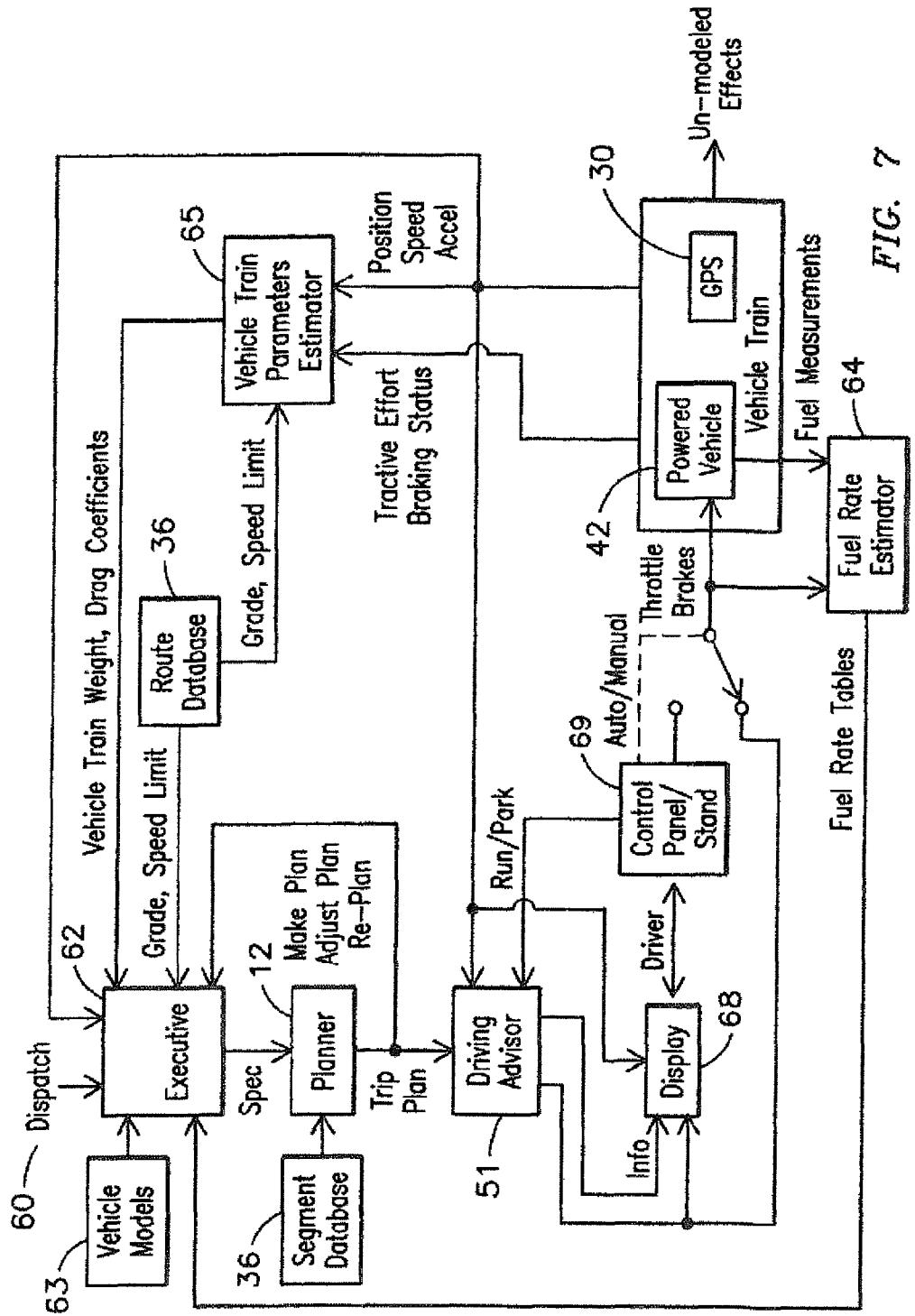
FIG. 7 is a schematic view of one embodiment of a system for optimizing a mission of a powered system.

FIG. 7 depicts a schematic view of another embodiment of a trip optimizer system 700. The system 700 may be similar to the system 300. For example, the system 700 may be used to create and/or re-plan a trip plan that reduces fuel consumed and/or emissions generated by the vehicle 42, 204 and/or vehicle train 31 during a trip. As discussed previously, a remote facility, such as a dispatch 60, can provide information to an executive control element 62 of the system 700. Also supplied to the executive control element 62 is information from a vehicle modeling database 63, information from a route database 36 such as, but not limited to, route grade information, speed limit information, water current flow and/or direction, estimated vehicle and/or vehicle train parameters (such as, but not limited to, weight and drag coefficients), and/or fuel rate tables from a fuel rate estimator 64. The executive control element 62 supplies information to a planner unit 12, which may include or represent a processor or other controller that performs one or more of the operations disclosed in connection with FIG. 1. Once a trip plan has been calculated, the trip plan is supplied to a driving advisor, driver (operator), or controller element 51. The trip plan also can be supplied to the executive control element 62 so that the element 62 can compare the trip when other new data is provided.

As discussed above, the controller element 51 can automatically set a throttle power, either a pre-established throttle setting or an optimum continuous throttle power based on the trip plan. In addition to supplying a speed command to the marine vessel 204 or other powered vehicle 42, a display 68 is provided so that the operator can view what the planner has recommended (e.g., the designated operational settings of the trip plan). The operator also has access to a control panel 69 through which the operator can decide whether to apply the notch power (or other designated operational setting) recommended by the trip plan. Toward this end, the operator may limit a targeted or recommended power of the trip plan. That is, the operator may have final authority over what power setting the vehicle or vehicle train will operate at. This includes deciding whether to apply braking if the trip plan recommends slowing the vehicle 42, 204 and/or vehicle train 31. For example, if operating in dark territory, or where information from wayside equipment cannot electronically transmit information to a vehicle train and instead the operator views visual signals from the wayside equipment, the operator can input commands based on information contained in the route database and visual signals from the wayside equipment. Based on how the vehicle 42, 204 and/or vehicle train 31 is functioning, information regarding fuel measurement is supplied to the fuel rate estimator 64. In one embodiment, if direct measurement of fuel flows is not available, the information on fuel consumed and projections of fuel consumed based on following trip plans can be carried out using calibrated physics models such as those used in developing the optimal plans. For example, such predictions may include, but are not limited to, the use of measured gross horse-power and known fuel characteristics to derive the cumulative fuel used.

The vehicle 42, 204 and/or vehicle train 31 also has the locator device 30 such as a GPS sensor, as discussed above. Information is supplied to a vehicle train parameters estimator 65. Such information may include, but is not limited to, GPS sensor data, tractive/braking effort data, braking status data, speed, and any changes in speed data. With information regarding grade and speed limit information, vehicle weight and drag coefficients information is supplied to the executive control element 62.

One or more embodiments of the trip optimizer system 700 may also allow for the use of continuously variable power throughout the optimization planning and closed loop control implementation. In the rail context, for example, the power of a conventional locomotive is typically quantized to eight discrete levels. The same may be true for certain marine vessels, as being limited to discrete throttle levels. Modern powered vehicles can realize continuous variation in horsepower which may be incorporated into the previously described optimization methods. With continuous power, the marine vessel or other powered vehicle 42, 204 can further optimize operating conditions, e.g., by reducing or minimizing auxiliary loads and power transmission losses, and fine tuning engine horsepower regions of increased efficiency, or to points of increased emissions margins. Examples include, but are not limited to, minimizing or reducing cooling system losses, adjusting alternator voltages, adjusting engine speeds, and reducing number of powered axles. Further, the marine vessel 204 or other powered vehicle 42 may use the on-board route database 36 and the forecasted performance requirements to reduce or minimize auxiliary loads and power transmission losses to provide improved efficiency for the target fuel consumption/emissions. Examples include, but are not limited to, reducing a number of powered axles on flat terrain and pre-cooling the vehicle engine prior to entering an airflow restricted area, such as a tunnel or an area that is at least partially surrounded by high ground or buildings.

One or more embodiments of the presently described inventive subject matter may also use the on-board route database 36 and the forecasted performance of the vehicle 42, 204 to adjust the vehicle performance, such as to insure that the vehicle 42, 204 has sufficient speed to move through one or more segments of the route 34, such as when the vehicle approaches a hill, tunnel, area of fast current, or the like. For example, this could be expressed as a speed constraint at a particular location that becomes part of the optimal plan generation created solving the equation (OP). Additionally, one or more embodiments of the system 300, 700 may incorporate vehicle- and/or vehicle train-handling rules, such as, but not limited to, tractive effort ramp rates, braking effort ramp rates, and the like. These may be incorporated directly into the formulation for optimum trip profile or alternatively incorporated into the closed loop regulator used to control power application to achieve a target speed.

In one embodiment, the trip optimizer system of 300, 700 is only installed on a lead vehicle 42, 204 of a consist. Even though the system 300, 700 may not be dependent on data or interactions with other vehicles 42, 204 in one embodiment, the system 300, 700 may be integrated with a consist manager, as disclosed in U.S. Pat. No. 6,691,957 and U.S. Pat. No. 7,021,588 (owned by the Assignee and both incorporated by reference), and/or a consist optimizer functionality to improve efficiency. Interaction with multiple separate vehicles 42, 204 or vehicle trains 31 also may be provided, as illustrated by the example of dispatch arbitrating two "independently optimized" vehicles or vehicle trains described herein.

Vehicle trains 31 with distributed power systems can be operated in different modes. One mode is where all vehicles 42, 204 in the vehicle train 31 operate at the same throttle command (e.g., throttle setting). If the lead vehicle in the distributed power system is commanding motoring of the other (e.g., trail or remote) vehicles in the distributed power system, then all vehicles 42, 204 in the vehicle train 31 may be commanded to generate motoring at the same notch setting. Another mode of operation is "independent" control. In this mode, vehicles 42, 204 or sets of vehicles 42, 204 distributed throughout the vehicle train 31 can be operated at different motoring or braking powers (e.g., different throttle or brake settings). For example, in the case of a railroad train, as the train crests a mountaintop, the lead locomotives (on the down slope of mountain) may be placed in braking, while the locomotives in the middle or at the end of the train (on the up slope of mountain) may be in motoring. This is done to minimize tensile forces on the mechanical couplers that connect the railcars and locomotives. Traditionally, operating the distributed power system in "independent" mode required the operator to manually command each remote vehicle or set of vehicles via a display in the lead vehicle. Using the physics-based planning model, vehicle train set-up information, on-board route database, on-board operating rules, location determination system, real-time closed loop power/brake control, and/or sensor feedback, the system 300, 700 is able to automatically operate the distributed power system in "independent" mode. For example, the system 300, 700 may generate different throttle and/or braking commands (e.g., different throttle settings and/or brake settings) for different powered vehicles 42, 204 of the same vehicle train 31 operating in a distributed power mode to cause the vehicle train 31 to operate at or near the designated operational settings (e.g., speed) of the trip plan.

When operating in distributed power, the operator in a lead vehicle can control operating functions of remote vehicles in the remote consists via a control system, such as a distributed power control element. Thus, when operating in distributed power, the operator can command each consist to operate at a different throttle power level (or one consist could be in motoring and another could be in braking), wherein each individual vehicle in the consist operates at the same throttle power. In an example embodiment, with the trip optimizer system 300, 700 installed on the vehicle train 31 and in communication with the distributed power control element (e.g., the element 51 and/or 62), when a throttle power level for a remote consist is desired as recommended by the trip plan, the system 300, 700 can communicate this power setting to the remote consists for implementation. The same can be true regarding braking/deceleration.

One or more embodiments of the system 300, 700 may be used with consists in which the powered vehicles 42, 204 are not contiguous (e.g., the vehicles 42, 204 capable of self propulsion are spaced apart by and interconnected with 1 or more other units or vehicles of the vehicle train 31). Such configurations can be operated in the distributed power mode described above, where a connection between the powered vehicles 42, 204 includes radio links and/or auxiliary cables to link the powered vehicles. When operating in distributed power, the operator in a lead powered vehicle can control operating functions of remote powered vehicles in the consist via a control system, such as a distributed power control element. In particular, when operating in distributed power, the operator can command each consist to operate at a different throttle power level (or one consist could be in motoring and other could be in braking) wherein each individual powered vehicle in the consist operates at the same throttle power level.

When operating with distributed power, the optimization problem previously described can be enhanced to allow additional degrees of freedom, in that each of the remote vehicles 42, 204 can be independently controlled from the lead vehicle 42, 204. The value of this is that additional objectives or constraints relating to in-train forces may be incorporated into the performance function, assuming the model to reflect the in-train forces is also included. Thus, one or more embodiments of the system 300, 700 may include the use of multiple throttle controls to better manage in-train or in-consist forces (e.g., forces between coupled vehicles 42, 204), fuel consumption and/or emissions.

In a vehicle train 31 utilizing a consist manager, the lead powered vehicle 42, 204 in a consist may operate at a different throttle power setting than other powered vehicles 42, 204 in that consist. The other powered vehicles 42, 204 in the consist operate at the same throttle power setting. One or more embodiments of the system 300, 700 may be utilized in conjunction with the consist manager to command throttle power settings for the vehicles 42, 204 in the consist. Thus, since the consist manager divides a consist into two or more groups, namely, lead powered vehicle 42, 204 and trail or remote units or vehicles 42, 204, the lead powered vehicle 42, 204 may be commanded to operate at a certain throttle power and the trail or remote powered vehicles 42, 204 are commanded to operate at another certain throttle power. In one example embodiment, the distributed power control element (e.g., the element 51 and/or 62) may be the system and/or apparatus where this operation is housed.

Likewise, when a consist optimizer is used with a consist, the trip optimizer system 300, 700 can be used in conjunction with the consist optimizer to determine throttle power for each powered vehicle 42, 204 in the consist. For example, a trip plan may recommend a throttle power setting of 4 for the consist. Based on the location of the vehicle train 31, the consist optimizer may take this information and then determine the throttle power setting for each powered vehicle 42, 204 in the consist. In this implementation, the efficiency of setting throttle power settings over intra-train communication channels can be improved. Furthermore, implementation of this configuration may be performed utilizing the distributed control system.

Furthermore, one or more example embodiments of the trip optimizer system 300, 700 may be used for continuous corrections and re-planning with respect to when the vehicle train 31 uses braking based on upcoming items of interest, such as but not limited to, railroad crossings, grade changes, sidings, depot yards, fuel stations, docks, loading stations, canals, locks, slow traffic or low wake areas, and the like, where two or more powered vehicles 42, 204 in the consist may be associated with different braking settings by the trip plan. For example, if a railroad train is coming over a hill, the lead locomotive may have to enter a braking condition whereas the remote locomotives, having not reached the peak of the hill may have to remain in a motoring state.

Figure 8:
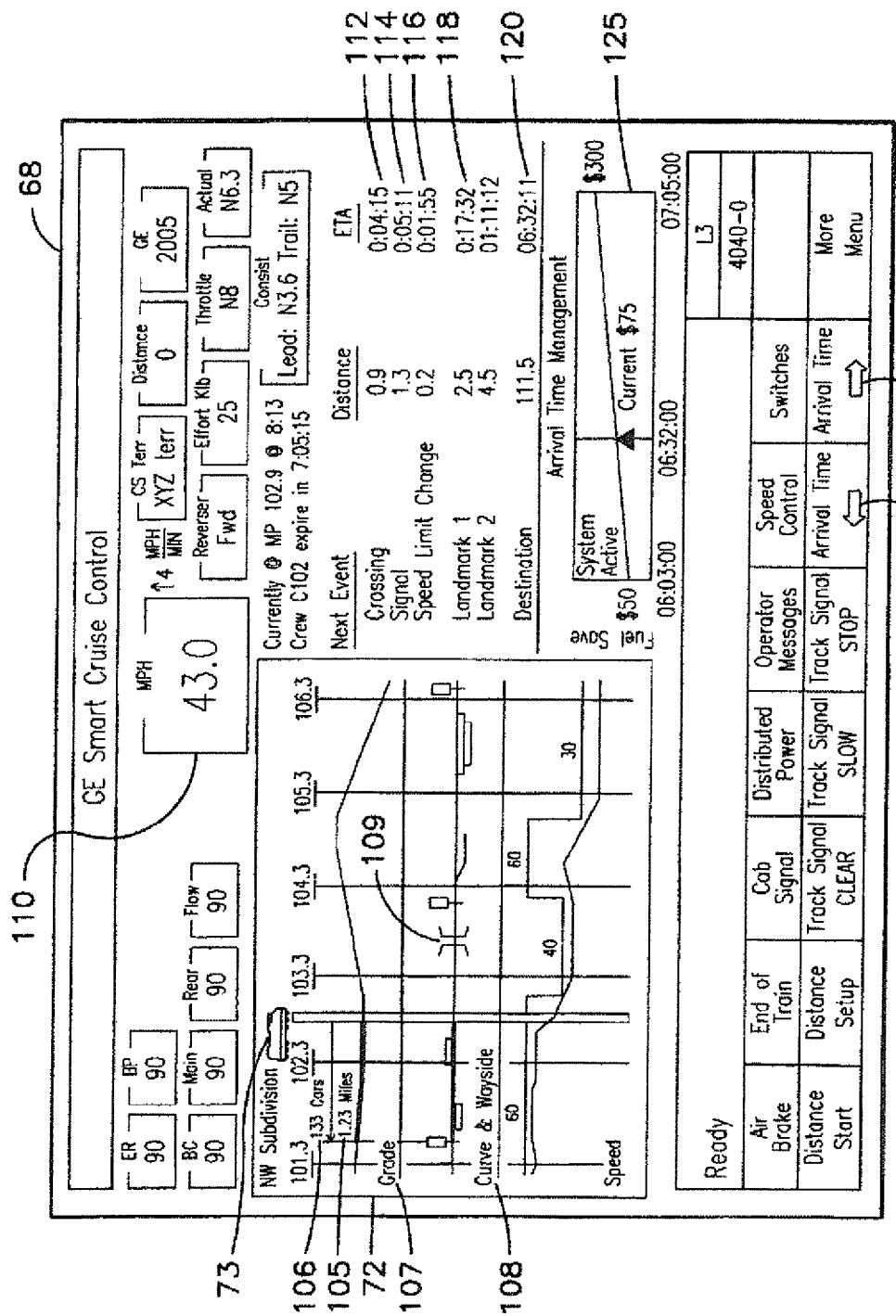
FIG. 8 depicts an example embodiment of a dynamic display for use by an operator.
Figure 9:
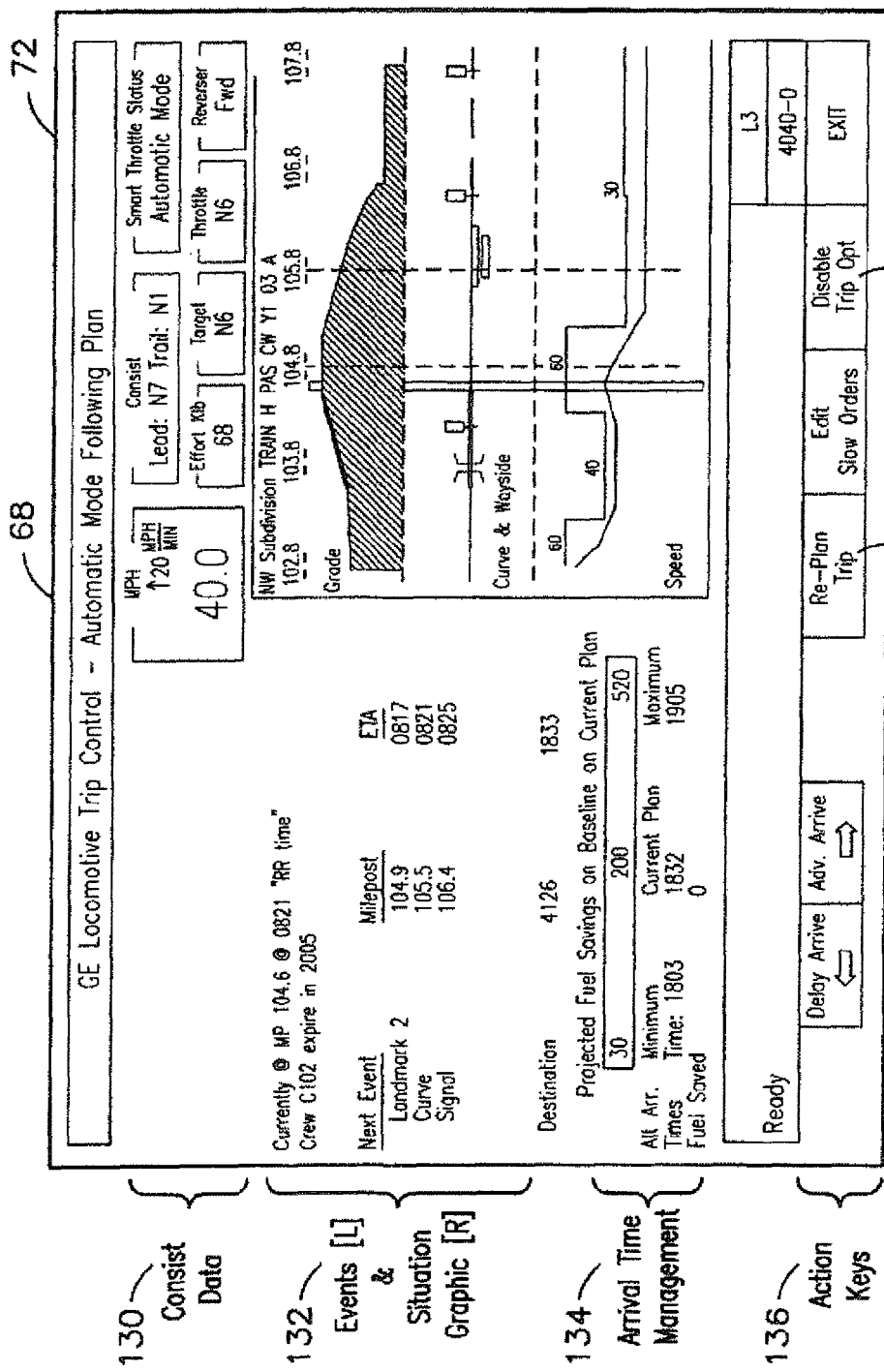
FIG. 9 depicts another example embodiment of a dynamic display for use by the operator.
Figure 10:
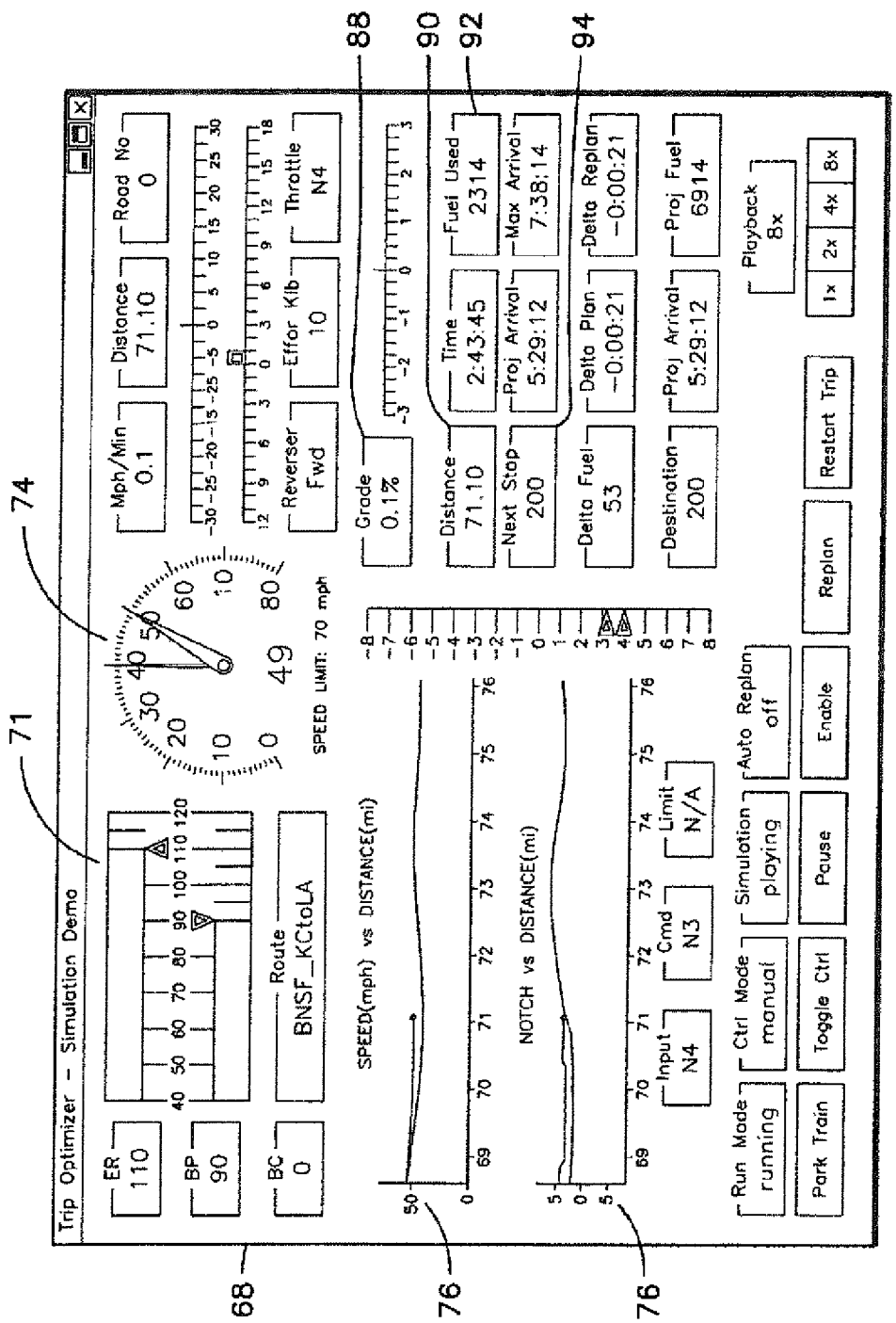
FIG. 10 depicts another example embodiment of a dynamic display for use by the operator.

FIGS. 8, 9, and 10 depict example illustrations of dynamic displays 68 for use by the operator of the vehicle 42, 204. The examples given in FIGS. 8, 9, and 10 are with respect to rail vehicles, e.g., railroad trains and locomotives, but also may apply to marine vessels 204 and other vehicles. As shown in FIG. 8, a trip profile or trip plan 72 is provided in the form of a rolling map. Within the trip plan 72, a location 73 of the vehicle 42, 204 is provided. Such information as a length 105 (or other size) of the vehicle 42, 204 and/or vehicle train 31 and the number of vehicles 106 in the vehicle 42, 204 and/or vehicle train 31 also is provided. Display elements can be provided regarding route information, such as a grade and/or current 107 of the route 34, curve and/or wayside elements 108, including bridge location 109, and speed 110. The display 68 allows the operator to view such information and also see where the vehicle 42, 204 and/or vehicle train 31 is along the route 34. Information pertaining to distance and/or estimate time of arrival to such locations as crossings 112, signals 114, speed changes 116, landmarks 118, and destinations 120 is provided. An arrival time management tool 125 is also provided to allow the user to determine the fuel savings that is being realized during the trip. The operator has the ability to vary arrival times 127 and witness how this affects the fuel savings. As discussed herein, fuel saving is one example of only an objective that can be reviewed with a management tool. Toward this end, depending on the parameter being viewed, other parameters discussed herein can be viewed and evaluated with a management tool that is visible to the operator. The operator is also provided information about how long the crew has been operating the vehicle 42, 204 and/or vehicle train 31. In example embodiments, time and distance information may either be illustrated as the time and/or distance until a particular event and/or location, or it may provide a total elapsed time.

As illustrated in FIG. 9, an example display 68 provides information about consist data 130, an events and situation graphic 132, an arrival time management tool 134, and action keys 136. Similar information as discussed above is provided in this display as well. This display 68 also provides action keys 138 to allow the operator to re-plan as well as to disengage 140 the trip optimizer system 300, 700.

FIG. 10 depicts another example embodiment of the display. Data typical of a modern vehicle 42, 204 including air-brake status 71, analog speedometer with digital insert, or indicator, 74, and information about tractive effort in pounds force (or traction amps for DC locomotives or other electrically powered motors or propulsion systems) may be visible. An indicator 74 is provided to show the current designated speed of the trip plan being executed, as well as an accelerometer graphic to supplement the readout in mph/minute. New data for execution of the trip plan is shown in the center of the display, including a rolling strip graphic 76 with designated speed and notch setting versus distance of the trip plan compared to a history of these variables. In the illustrated embodiment, the location of the vehicle 42, 204 and/or vehicle train 31 is derived using the locator element 30. As illustrated, the location may be provided by identifying how far the vehicle 42, 204 and/or vehicle train is from a final or other destination, an absolute position, an initial destination, an intermediate point, and/or from operator input.

The strip chart provides a look-ahead to changes in speed used to follow the trip plan, which may be used to advise an operator that manually controls operations of the vehicle 42, 204 and/or vehicle train 31. In one embodiment, the strip chart may display differences between designated settings of the trip plan versus actual operational conditions during automatic control of operations of the vehicle 24, 402 and/or vehicle train 31. As discussed herein, such as when in the coaching mode, the operator can follow either the notch or speed suggested by the trip optimizer system 300, 700, for example. The vertical bar provides a graphic of designated settings of the trip plan and actual settings of the vehicle 42, 204 and/or vehicle train 31, which also are displayed digitally below the strip chart in the illustrated embodiment. When continuous notch power is utilized, the display may round to the closest discrete equivalent in one embodiment. The display may be an analog display so that an analog equivalent or a percentage or actual horse power/tractive effort of the vehicle 42, 204 and/or vehicle train 31 is displayed.

Information on status of the trip can be displayed on the display, which can include the current grade or current that the vehicle 42, 204 and/or vehicle train 31 is encountering 88, either by the lead vehicle 42, 204, a location elsewhere along the vehicle train 31, and/or an average over a length of the vehicle train 31. A distance traveled 90 so far in the trip plan, cumulative fuel used 92, where the next stop is planned 94 (or a distance there from), current and/or projected arrival time 96 at one or more locations, and/or expected time to arrive at one or more locations may be displayed. The display 68 may show an estimated time to one or more locations according to one or more available trip plans. If a later arrival is desired or selected, a re-plan of one or more trip plan may be performed. Delta plan data represents status for fuel and schedule ahead or behind a current trip plan. Negative numbers may represent less fuel consumed or early arrival time compared to the trip plan, positive numbers may represent more fuel consumed or late arrival time compared to the trip plan.

The display 68 may provide the operator of the vehicle 42, 204 with information representative of a comparison between an actual operation or location of the vehicle 42, 204 and the designated operations or locations of the trip plan. The illustrated display is for illustration of one embodiment and other displays of the information may be provided.

Another feature that may be included in the trip optimizer system 300, 700 is the providing of data logs and/or reports. This information may be stored on the vehicle train 31 and/or downloaded to an off-board system. Such downloads may occur via manual and/or wireless transmission. This information may also be viewable by the operator via the display 68. The data may include such information as, but not limited to, operator inputs, time periods that the system 300, 700 is operational, fuel saved by controlling the vehicle 42, 204 and/or vehicle train 31 according to the trip plan, imbalance between fuel consumption across vehicles 42, 204 in the vehicle train 31, vehicle train 31 journey off course, system diagnostic issues (such as if a GPS sensor is malfunctioning), and the like.

The system 300, 700 may take allowable time periods that a crew of the vehicle 42, 204 and/or vehicle train 31 may operator into consideration when a trip plan is created. For example, if a crew may operate for a limited time period (e.g., eight hours), then the trip plan may be created to include stopping locations and/or time periods to switch crews. Such specified stopping locations may include, but are not limited to rail yards, meet/pass locations, docking stations, ports of call, and the like. If, as the trip progresses, the trip time may be exceeded, the trip optimizer system 300, 700 may be overridden by the operator to meet criteria as determined by the operator. Ultimately, regardless of the operating conditions of the vehicle train, such as but not limited to high load, low speed, train stretch conditions, and the like, the operator remains in control to command a speed and/or operating condition of the vehicle or vehicle train.

Using the trip optimizer system 300, 700, the vehicle 42, 204 and/or vehicle train 31 may operate in a plurality of manners or modes. In one embodiment, the system 300, 700 may provide commands for commanding propulsion and dynamic braking. The operator then handles other vehicle operations. In another embodiment, the system 300, 700 may provide commands for commanding propulsion only. The operator then handles dynamic braking and/or other vehicle operations. In yet another embodiment, the system 300, 700 may provide commands for commanding propulsion, dynamic braking, and application of the brakes. The operator then handles other vehicle operations.

The trip optimizer system 300, 700 may be configured to notify the operator of upcoming items of interest or actions to be taken. Specifically, using forecasting logic as described above, the continuous corrections and re-planning to the trip plan, and/or the route database, the operator can be notified of upcoming crossings, signals, grade changes, brake actions, sidings, rail yards, fuel stations, docks, slow or low wake zones, restricted zones, channel or other navigational makers, and the like. This notification may occur audibly and/or through the operator interface.

Specifically, using the physics based planning model, vehicle train set-up information, on-board route database, on-board operating rules, location determination system, real-time closed loop power/brake control, and sensor feedback, the system presents and/or notifies the operator of required actions. The notification can be visual and/or audible. Examples include notifying of crossings that require the operator to activate a horn and/or bell, and, in the case of rail vehicles, notifying of "silent" crossings that do not require the operator activate the locomotive horn or bell.

In another embodiment, using the physics based planning model discussed above, vehicle train set-up information, on-board route database, on-board operating rules, location determination system, real-time closed power/brake control, and sensor feedback, the system may present the operator information (e.g., a gauge on display) that allows the operator to see when the vehicle train will arrive at various locations, as illustrated in FIG. 9. The system allows the operator to adjust the trip plan (e.g., target arrival time). This information (actual estimated arrival time or information needed to derive off-board) can also be communicated to the dispatch center to allow the dispatcher or dispatch system to adjust the target arrival times. This allows the system to quickly adjust and optimize for the appropriate target function (for example trading off speed and fuel usage).

In one example involving marine vessels, a plurality of tugs may be operating together as vehicles 204 of a vehicle train, where all are moving the same larger vessel (e.g., the vehicle train 31), with each tug is linked in time to accomplish the mission of moving the larger vessel. In another example, a single marine vessel may have a plurality of engines that operate as the vehicles 204 of the vehicle train 31 (e.g., the marine vessel). Off-highway vehicle (OHV) applications may involve a fleet of vehicles that have a same mission to move earth, from location "A" to location "B," where each OHV is linked in time to accomplish the mission. With respect to a stationary power generating station, a plurality of stations may be grouped together for collectively generating power for a specific location and/or purpose. In another embodiment, a single station is provided, but with a plurality of generators making up the single station. In one example involving locomotive vehicles, a plurality of diesel powered systems may be operated together where all are moving the same larger load, where each system is linked in time to accomplish the mission of moving the larger load. In another embodiment, a locomotive vehicle may have more than one diesel powered system.

Figures 11, 12, 13, 14:
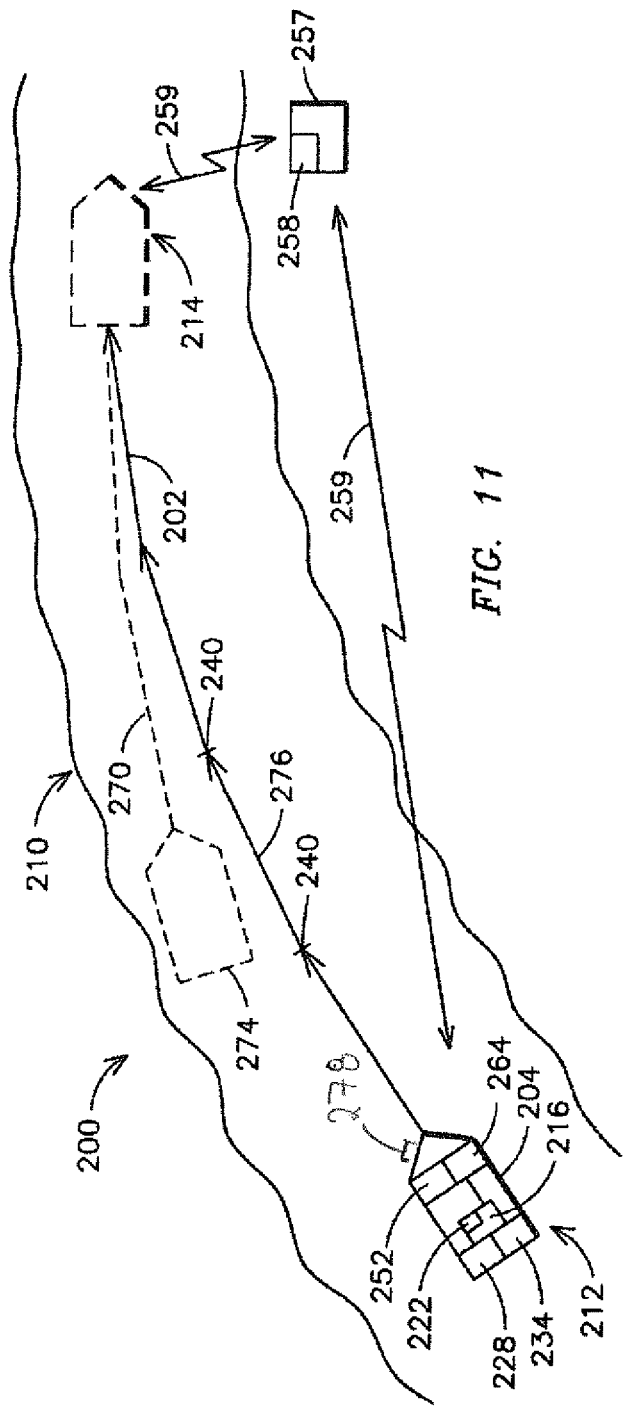
FIG. 11 illustrates a top schematic view of one example embodiment of a system for controlling a marine vessel.
FIG. 12 illustrates a plot of an example embodiment of an activation level of a propulsion system of the marine vessel through the waterway illustrated in FIG. 11.
FIG. 13 illustrates a plot of an example embodiment of an activated direction of a directional system of the marine vessel through the waterway illustrated in FIG. 11.
FIG. 14 illustrates a plot of an example embodiment of an activated direction of a directional system of the marine vessel through the waterway illustrated in FIG. 11.

FIG. 11 illustrates one embodiment of a system 200 for controlling a marine vessel 204 through a waterway 210. The system 200 may be similar to the system 300 and/or 700. For example, the system 200 may include the system 300 and/or 700 onboard the marine vessel 204 to generate a trip plan that dictates operational settings of the marine vessel 204 to travel along the waterway 210 from a first location 212 (e.g., an initial or current location) to a second (e.g., intermediate or final) location 214. For example, the marine vessel 204 may be one or more watercrafts traveling from an open-water location to a docking location at a docking station within the waterway 210. The marine vessel 204 may be any vessel having a water propulsion system and a directional system, such as a vessel having a diesel engine and an alternator and/or rectifier combination which provides A/C or D/C electrical power to an electrically powered propulsion system, for example. However, the marine vessel 204 may powered by an engine or source other than a diesel engine. Operating the marine vessel 204 according to the operational settings designated by the trip plan can reduce at least one of fuel consumed and/or emissions generated by the marine vessel 204, while causing the marine vessel 204 to arrive at a destination (or intermediate) location at a scheduled time or within a designated time range of the scheduled time. The scheduled time may be a time that the marine vessel 204 is to arrive at a docking station so that there is sufficient time (e.g., a designated unloading time period) to unload cargo and/or passengers being carried by the marine vessel 204. For example, the scheduled time may be sufficiently far in advance of a time that another vehicle (such as a rail vehicle, another marine vessel, an airplane, an off-highway vehicle, or other automobile or truck) is scheduled to depart from the docking station (or another nearby station) that the cargo or passengers on the marine vehicle 204 can be unloaded and loaded onto the other vehicle. The other vehicle can then depart from the docking station at or no later than a scheduled time of the other vehicle.

As illustrated in FIG. 11, the system 200 includes a processor or control unit 216 positioned on the marine vessel 204. Alternatively, the processor 216 may be positioned at a remote location (e.g., off board) from the marine vessel 204. The processor 216 includes or is connected with a memory 222, such as a tangible computer readable storage medium, which stores one or more operating parameter(s) of the marine vessel 204 and navigational data of the waterway 210. "Operating parameter" refers to an aspect of the marine vessel as relating to propulsion of the marine vessel 204 through the waterway 210. Therefore, in one embodiment, the stored operating parameters may include a mass of the marine vessel 204, a drag coefficient of the marine vessel 204, and/or a power characteristic of a propulsion system 228 of the marine vessel 204, for example. Additionally, in one embodiment, the stored navigational data of the waterway 210 includes one or more of a geographical map of the waterway 210 in computer readable form, a location of one or more obstacle(s) within the waterway 210, one or more dimension(s) of the waterway 210, one or more dock location(s) along the waterway 210, forecast data (e.g., weather forecasts) of the waterway 210, water current data (e.g., speed and/or direction of water flow) of the waterway 210, and/or vessel traffic data within the waterway 210, for example.

The marine vessel 204 includes a propulsion system 228 and a directional system 234, which are both coupled to the processor 216. The propulsion system 228 imparts a selective propulsion force on the marine vessel 204 to propel the marine vessel 204 through the waterway 210. The propulsion system 228 operates based on a propulsion command received from the processor 216. The propulsion command may instruct the power, horsepower, speed, and/or acceleration at which the marine vessel 204 is to move and the propulsion system 228 may generate sufficient force to meet the instructed power, speed, and/or acceleration. The directional system 234 controls the direction in which the marine vessel 204 is steered based on a direction command received from the processor 216. For example, the directional system 234 may receive the direction command and control a rudder or other device that controls where the marine vessel 204 moves.

The propulsion system 228 and directional system 234 are configured to impart a velocity to the marine vessel 204 based on commands received from the processor 216. The term "velocity" refers to a vector quantity comprising a speed and direction. The propulsion system 228 may include, for example, one or more propellers, a power source (e.g., engine) for driving the propellers, and/or a drive train connecting the power source and propellers. The propulsion system 228 may not be water based. For example, the propulsion system 228 may include an air-driver system (e.g., fans/propellers) and/or chemical propellant-based systems.

The directional system 234 may include, for example, a mechanism for changing the position or orientation of the propellers in the water, a rudder or rudder system, or the like. The propulsion system 228 and directional system 234 may be all or partially integrated, such as in an outboard motor.

In one embodiment, the propulsion system 228 and the directional system 234 may be combined. For example, the propulsion system 228 and the directional system 234 can be provided as one or more sails of a wind-powered marine vessel 204, where the sails are controlled based on the propulsion command and the direction command. The propulsion command may instruct the sails to raise or lower to increase or decrease, respectively, the force used to propel the marine vessel 204 from the wind. The direction command may instruct the sails to change orientation to move the marine vessel 204 in a corresponding direction.

The processor 216 includes or is coupled with a transceiver 252 that forms a communication link 259 with a remote (e.g., off board the marine vessel 204) station 257. Although the remote station 257 in FIG. 11 is positioned adjacent to the second location 214, the remote station 257 may be positioned at another location within a proximate range while being capable of establishing the communication link 259 with the processor 216 at one or more times during a trip of the marine vessel 204 along the waterway 210. In one embodiment, the remote station 257 may be positioned adjacent to a final location 214 of a trip of the marine vessel 204. The remote station 257 transmits the one or more operating parameter(s) of the marine vessel 204 and/or the navigational data of the waterway 210 to the processor 216 over the communication link 259 subsequent to receiving a request signal from the processor 216 over the communication link. Alternatively, the remote station 257 may periodically transmit such information to the processor 216 and/or may transmit such information when prompted by an operator at the remote station 257.

Using the methods for generating a trip plan described above, the processor 216 determines a trip plan for the marine vessel 204 to travel through the waterway 210 from the first location 212 to the second location 214. Alternatively, the trip plan may be provided by the remote station 257 and communicated to the processor 216. The trip plan may include a designated path 202 for the marine vessel 204 to travel. For example, in contrast to vehicles such as automobiles and rail vehicles that have fixed routes, the processor 216 can examine a variety of paths along a waterway 210 for the marine vessel 204 to travel along. The trip plan can include designated propulsion commands 229 (FIG. 12) and/or designated direction commands 235 (FIGS. 13-14) to dictate how the marine vessel 204 propels itself along the path of the trip plan. The designated propulsion commands 229 and/or direction commands 235 can be expressed as a function of at least one of time and/or distance along the designated path, and can be transmitted to the propulsion and directional systems 228, 234 at one or more incremental locations 240 along the path 202.

FIG. 12 illustrates examples of designated propulsion commands 229 of a trip plan that are transmitted from the processor 216 to the propulsion system 228 as the marine vessel 204 travels along the waterway 210 from the first location 212 to the second location 214. FIG. 13 illustrates examples of designated direction commands 235 of the trip plan that are transmitted from the processor 216 to the propulsion system 228 as the marine vessel 204 travels along the waterway 210 from the first location 212 to the second location 214. FIG. 14 illustrates other examples of designated direction commands 235 of the trip plan that are transmitted from the processor 216 to the propulsion system 228 as the marine vessel 204 travels along the waterway 210 from the first location 212 to the second location 214. As shown in FIG. 12, the designated propulsion commands 229 may change at different times or locations (e.g., as represented by the horizontal axis of FIG. 12) along the trip, and may be expressed as throttle settings and/or directions (e.g. forward or backward). As shown in FIG. 13, the designated direction commands 235 may change at different times or locations (e.g., as represented by the horizontal axis of FIG. 13) along the trip, and may be expressed as angular orientations of a rudder or other steering component. As shown in FIG. 14, the designated direction commands 235 may alternatively or additionally be expressed as changes in heading directions of the marine vessel 204 about or along a center path (e.g., the designated path 202).

The processor 216 determines the path 202, and the propulsion commands 229, and/or direction commands 235 so to optimize a performance characteristic of the marine vessel 204 along the designated path 202. In one example embodiment, the optimization of the performance characteristic of the marine vessel 204 along the optimal path 202 is one of an optimization (e.g., increase but not necessarily maximizing or the largest possible) of a fuel efficiency of the marine vessel 204 along the optimal path 202. Alternatively or additionally, the optimization of the performance characteristic of the marine vessel 204 along the optimal path 202 is one of an optimization (e.g., an increase but not necessarily maximizing or the largest possible) of an energy efficiency of the marine vessel 204 along the optimal path 202. Alternatively or additionally, the optimization of the performance characteristic of the marine vessel 204 along the optimal path 202 is one of an optimization (e.g., reduction but not necessarily elimination or the shortest possible) of a transit time of the marine vessel 204 along the designated path 202. Alternatively or additionally, the optimization of the performance characteristic of the marine vessel 204 along the optimal path 202 is one of a waypoint arrival time (e.g., arriving at a scheduled arrival time or within a designated time range of a scheduled arrival time) at one or more incremental or intermediate locations 240 of the marine vessel 204 along the designated path 202, for example.

The determination of the designated path 202, the designated propulsion commands 229, and/or the designated direction commands 235 can be based on the first location 212, the second location 214, the one or more operating parameter(s) of the marine vessel 204, the designated performance characteristic to be optimized, the received navigational data of the waterway 210, and the like. However, these determinations may be based on less than all of these parameters, or may be based on additional parameters related to the operating conditions of the marine vessel 204 and/or the conditions of the waterway 210, for example.

As the marine vessel 204 travels along the designated path 202, the processor 216 may be switched into an automatic mode to cause the marine vessel 204 to be automatically controlled to have a path of travel along the designated path 202 and/or to provide the actual propulsion designated by the propulsion commands 229. The marine vessel 204 can include a position determination device 264 to measure a position of the marine vessel 204, such as a global position system (GPS) transceiver in communication with one or more GPS satellites, an inertial navigational system, a LORAN system, a sensed magnetic compass, and/or a radar system such as a primary, transponder or Doppler radar system, for example. The position determination device 264 is coupled to the processor 216 to transmit the measured position to the processor 216 as the marine vessel 204 travels along the designated path 202 of the waterway 210. The designated optimal path 202 that can be determined by the processor 216 includes designated positions of the marine vessel 204 through the waterway 210 from the first location 212 to the second location 214. At one or more intermediate or incremental locations 240 from the first location 212 to the second location 214, the processor 216 may sample (e.g., determine) the actual position of the marine vessel 204 and compare the actual position with the expected or designated position of the marine vessel 204 at the respective incremental location 240 according to the trip plan. If the measured positioned does not vary from the designated position of the trip plan, then no corrective action may be performed by the processor 216. On the other hand, if the measured position of the marine vessel 204 varies from the designated position of the trip plan, but by less than a predetermined threshold distance stored in the memory 222 of the processor 216, then the processor 216 can determine and transmit a corrective propulsion command and/or a corrective direction command to cause the propulsion system and the direction system to propel the marine vessel 204 toward the designated position of the designated path 202. Alternatively, if the measured position of the marine vessel 204 varies from the designated position by less than the predetermined threshold distance, and/or if the processor 216 determines that the variation in locations is due to an error in one of the inputted first location, second location, the one or more operating parameter(s), the navigational data, and the like (upon which the trip plan is based), then the processor 216 is configured to correct the error in the inputted data so to avoid future variations between the measured and expected position of the marine vessel 204 at subsequent incremental locations 240 along the waterway 210.

Alternatively, if the measured or actual position of the marine vessel 204 deviates from the designated position of the trip plan by more than the threshold distance, then the processor 216 (or the remote location) can modify (e.g., re-plan) the trip plan with an initial location of the marine vessel 204 being the current position of the marine vessel 204. For example, as illustrated in FIG. 11, if a measured or actual position 274 of the marine vessel 204 varies with the designated position 276 by more than the stored predetermined threshold, the processor 216 determines a substitute designated path 270 for the marine vessel 204 to travel through the waterway 210 from the measured position 274 to the second location 214. The processor 216 may recalculate the designated path 270, with the measured position 274 being used in place of the first location 212 for the previous designated path 202 formed by the processor 216. The processor 216 also may determine one or more substitute or modified propulsion commands and/or substitute direction commands associated with one or more locations along the substitute designated path 270. The determination of the substitute path 270, the substitute propulsion commands, and the substitute direction commands may be based on the measured position 274, the second location 214, the one or more operating parameter(s), the designated performance characteristic to be optimized, the navigational data, and the like.

While the marine vessel 204 is traveling along the designated path 202 from the first location 212 to the second location 214, and the processor 216 is in the automatic mode (e.g., is automatically controlling the propulsion and directional systems to automatically implement the designated operational settings of the trip plan), an operator of the marine vessel 204 may switch the processor 216 from the automatic mode to a manual mode. In the manual mode, the measured position, the designated position, the designated propulsion command 229, and/or the designated direction command 235 at one or more intermediate or incremental locations 240 are transmitted to and displayed on an operator interface (such as those shown in FIGS. 8, 9, and 10). After viewing the operator interface, the operator may manually control one or more control devices of the marine vessel 204 to transmit a propulsion command that is equivalent or similar to the designated propulsion command 229 to the propulsion system 228 and/or to transmit a direction command that is equivalent or similar to the designated direction command 235 to the directional system 234. Additionally, the operator may transmit a propulsion and direction command which differ from the respective designated propulsion and direction command, such as when unforeseeable circumstances arise (e.g., events that the trip plan is not based on), such as a sudden change in water current, changes in vessel traffic, an obstacle, and/or the designated commands appear to be inaccurate, to divert the marine vessel 204 away from the designated path 202.

In one embodiment, at one or more, or each, of the incremental locations 240 along the waterway 210, the processor 216 determines and stores an emergency propulsion command and/or an emergency direction command in the memory 222. The emergency propulsion and direction commands are based on the measured position of the marine vessel 204 and a location of a dock within the waterway 210.

The location of the dock may be obtained from the stored navigational data, or can be designated by the operator on the interface. The location of the dock upon which the emergency commands are based may be the location of a dock that is closer to the marine vessel 204 (e.g., along a path in the waterway 210) than one or more, or all, other docks in the waterway 210. Thus, in an emergency situation, such as if an unforeseeable circumstance arises, such as an unforeseeable water current, vessel traffic, an obstacle, and/or marine vessel 204 system failure, an operator may switch the processor 216 from the automatic or manual mode into a safety mode. In the safety mode, the processor 216 transmits the emergency propulsion and/or direction commands to the propulsion system 228 and/or directional system 234, in order to direct the marine vessel 204 to the location of the dock. The dock location may be referred to as a designated safe location or default safe position. The designated safe location may change as the marine vessel 204 moves along the waterway 210. Alternatively, from an automatic mode, the processor 216 may compare the measured position with the navigational data, such as an obstacle within the waterway 210 and/or a boundary of the waterway 210, for example. If the processor 216 determines that the measured position is within a predetermined threshold distance of the navigational data, the processor 216 switches from the automatic mode to a safety mode and transmits the emergency propulsion and direction commands to the respective propulsion system 228 and directional system 234, for example.

In another embodiment, the designated safe location or default safe position may be the current location. For example, when the marine vessel 204 enters the safety mode, the processor 216 may generate commands to stop propulsion and remain in the current location.

An operator input interface may be provided within the marine vessel 204, including a display and an input device. The operator input interface is coupled to the processor 216, and is activated to input one or more of the first location, the second location, a desired transit time, and/or the performance characteristic to be optimized, for example. Subsequent to inputting this data, the input device is activated to prompt the processor 216 to determine the designated path 202, the designated propulsion commands 229, and the designated direction commands 235 of the marine vessel 204 through the waterway 210.

When the marine vessel 204 approaches a final location 214 (e.g., a landing at which the vessel is supposed to dock), control over movement of the marine vessel 204 may be transferred from the processor 216 to the remote station 257 so that the entity (e.g., an operator at a port location) that controls the movement of the marine vessel 204 has a viewpoint or visual perspective from outside the marine vessel. As discussed above, the transceiver 252 of the processor 216 forms a communication link 259 with a remote station 257, such as a remote station positioned adjacent to or near the final location 214. When the marine vessel 204 is located within a threshold distance of the final location 214 or another designated docking location, the processor 216 may transmit a request command signal to the remote station 257 over the communication link 259. In response, the remote station 257 can transmit an acknowledge command signal to the processor 216. After the transmission of the acknowledge command signal, the processor 216 may stop transmitting the designated propulsion commands 229 and/or designated direction commands 235 of the trip plan to the propulsion and directional systems 228, 234. Instead, control of the marine vessel 204 may be transferred to the remote station 257, which may transmit one or more propulsion commands and/or direction commands to the propulsion and/or directional systems 228, 234 when the marine vessel 204 is located at one or more incremental or intermediate locations along the threshold distance to the final location 214. The remote station 257 may include a manual operator who transmits propulsion and direction commands to the marine vessel 204, based on his or her visual monitoring of the marine vessel 204 entering the final location 214.

In another embodiment, the processor 216 may generate a docking plan or receive a docking plan from the remote station 257. The docking plan may be similar to a trip plan in that the docking plan may include one or more designated operational settings (e.g., propulsion and/or direction commands) expressed as a function of distance and/or time as the marine vessel 204 travels from a starting location (e.g., the second location) to a docking location (e.g., when the marine vessel 204 is docked). The processor 216 can automatically control operations of the marine vessel 204 according to the docking plan to get the marine vessel 204 to dock and/or may present instructions to an operator onboard the marine vessel 204 or in the remote station 257 in order to direct the operator to manually control operations of the marine vessel 204 to guide the marine vessel 204 to the dock.

The docking plan may take into account open or available spaces at a dock. For example, during busy time periods, relatively few spaces at a dock may be available to dock the marine vessel 204. The docking plan may designate direction commands that cause the marine vessel 204 to be guided to an open or available docking location. The identification of open or available docking locations can be provided by the remote station 257. The docking plan may designate propulsion commands that cause the marine vessel 204 to be guided to an occupied docking location (e.g., another marine vessel is currently located at the dock) at a time when the other marine vessel has departed and the dock is available.

In another embodiment, the processor 216 may re-plan or otherwise update a trip plan being used to control movement of the marine vessel 204 along the designated path 202 to change a time of arrival of the marine vessel 204 at the dock. For example, if a first schedule of the marine vessel 204 includes the marine vessel 204 arriving and docking at a dock at a first time, the processor 216 can generate a first trip plan that directs operations of the marine vessel 204 to arrive at the dock at the first time. But, due to schedule changes at the dock (e.g., one or more other marine vessels staying longer at the docks or leaving earlier than expected), the processor 216 may change the trip plan en route to the dock. For example, if a docking location of the marine vessel 204 at the dock is available or will be available earlier than the previously scheduled first time, then the processor 216 may change the trip plan to cause the marine vessel 204 to arrive at an earlier second time at the dock. Conversely, if the docking location is occupied and will be occupied when the marine vessel 204 is scheduled to arrive, then the processor 216 may change the trip plan so that the arrival time of the marine vessel 204 at the dock is delayed until a later time when the docking location is available. Changing the trip plan in this way can further reduce fuel consumed and/or emissions generated by the marine vessel 204 as the modified trip plan may direct the marine vessel 204 to travel at slower speeds.

In another embodiment, the marine vessel 204 can include one or more sensors 278 that monitor characteristics of the waterway 210. The sensor 278 shown in FIG. 11 may represent a single sensor or multiple sensors. The sensor 278 can monitor a direction and/or speed of water current flow in the waterway 210, a direction and/or speed of wind movement above the waterway 210, a temperature of the waterway 210, salinity of the water in the waterway 210, a depth of the waterway 210, and the like. The sensor 278 generates sensed signals that are communicated to the processor 216 for reporting the monitored characteristics of the waterway 210. Alternatively, one or more of the characteristics of the waterway 210 may be communicated to the processor 216 from an off-board location, such as the remote facility 257.

The processor 216 can generate or modify the trip plan based on the characteristics of the waterway 210. For example, the processor 216 can create the designated direction commands of the trip plan to be oriented along a common direction as the direction of the current and/or wind for one or more portions of the trip plan. Orienting the direction of travel of the marine vessel 204 with the current and/or wind can allow the propulsive force that is generated by the propulsion system of the marine vessel 204 to be reduced relative to traveling along another direction. The direction of travel of the marine vessel 204 may be aligned with the current or wind when the heading or angular orientation of the direction of travel and the direction of the current flow or wind movement are within a designated range of each other, such as within 1 degree, 5 degrees, 10 degrees, 15 degrees, 30 degrees, and the like. As another example, the processor 216 can modify a current trip plan if the directional commands of the trip plan cause the marine vessel 204 to travel against the direction of current flow and/or wind movement. The marine vessel 204 may travel against the direction of current flow and/or wind movement when the direction of travel and the direction of current flow and/or wind movement are not within a designated range of each other, such as the directions being 150 to 180 degrees apart from each other. The processor 216 can change the designated path of the marine vessel 204 so that the marine vessel 204 does not travel against the direction of the current flow and/or wind for more than a threshold distance or time. In one embodiment, the processor 216 may change the trip plan when the speed of the current and/or wind exceeds a designated threshold.

In another embodiment, the processor 216 may generate or modify a trip plan based on the depth of the waterway 210. For example, the marine vessel 204 may be able to travel at faster speeds using less propulsive power (e.g., and less fuel and/or emission generation) in deeper areas of the waterway 210 than shallower areas. The processor 216 may create or modify portions of the designated path to travel through deeper parts of the waterway 210 to reduce the amount of fuel consumed and/or emissions generated.

As described above, the processor 216 may re-plan (e.g., modify) the trip plan if movement of the marine vessel 204 deviates from the trip plan by more than a designated amount. The processor 216 can periodically compare an actual operational condition (e.g., an actual location, actual propulsive force, actual direction, and the like) of the marine vessel 204 with a designated operational setting of the trip plan (e.g., a designated location, designated propulsive force, and a designated direction) to determine whether to modify the trip plan. A frequency at which the processor 216 periodically compares the actual operational condition to the designated operational setting can be based on the at least one of the direction of water current flow, the speed of the water current flow, the direction of wind movement, or the speed of the wind movement. For example, as the speed and/or direction of the wind and/or current changes, the marine vessel 204 may be more likely to be moved (e.g., blown) off course. As a result, in one embodiment, as the speed of the current or wind increases, the processor 216 may more frequently check to see if the trip plan needs to be modified (e.g., in case the marine vessel 204 has been blown off course). Conversely, as the speed of the current or wind decreases, the processor 216 may check to see if the trip plan needs to be modified on a less frequent basis.

Figures 15, 16, 17, 18:
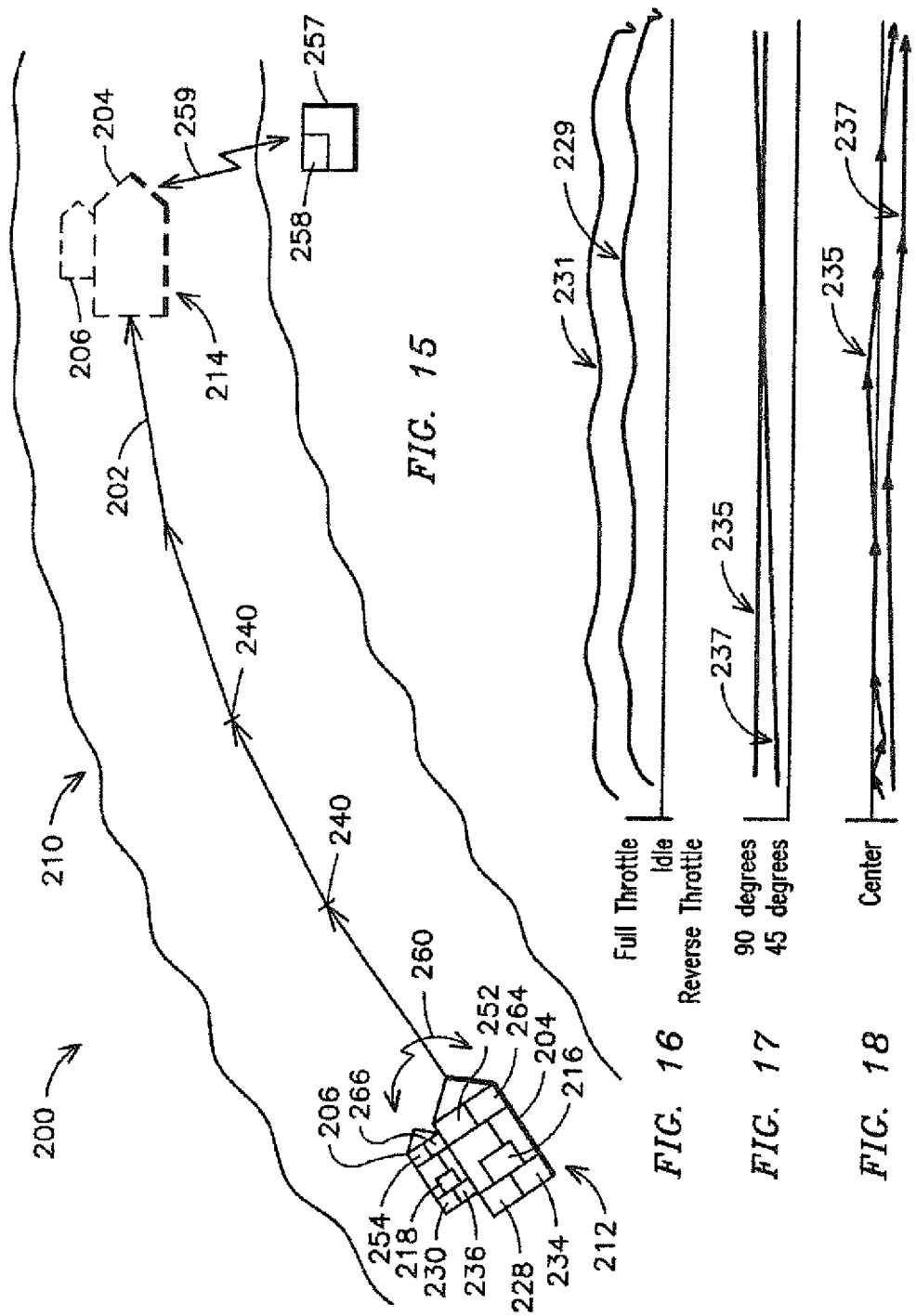
FIG. 15 illustrates a top schematic view of an example embodiment of a system for optimizing a path for a combination of a marine vessel and a secondary vessel through a waterway from a first location to a second location.
FIG. 16 illustrates a plot of an example embodiment of a respective activation level of a respective propulsion system of the combination of the marine vessel and the secondary vessel through the waterway illustrated in FIG. 15.
FIG. 17 illustrates a plot of an example embodiment of a respective activated direction of a respective directional system of the combination of the marine vessel and the secondary vessel through the waterway illustrated in FIG. 15.
FIG. 18 illustrates a plot of an example embodiment of a respective activated direction of a respective directional system of the combination of the marine vessel and the secondary vessel through the waterway illustrated in FIG. 15.

As illustrated in FIG. 15, a combination of vessels 204, 206 may include the first marine vessel 204 and a second marine vessel 206 that is coupled to the first marine vessel 204. The combination of the marine vessels 204, 206 may be referred to a consist, vehicle consist, or vehicle train, such as the vehicle train 31. The second marine vessel 206 has a second propulsion system 230 and a second directional system 236 similar to the propulsion system 228 and directional system 234 of the first marine vessel 204. The second marine vessel 206 includes a transceiver 254 which establishes a communication link 260 with the transceiver 252 of the marine vessel 204. Thus, the secondary propulsion system 230 and the second directional system 236 are coupled to the processor 216, through the communication link 260. Additionally, the second propulsion system 230 and second directional system 236 can be coupled to a second processor 218 on the second marine vessel 206. The second propulsion system 230 imparts a propulsion force on the second marine vessel 206 based on a propulsion command 231 (FIG. 16) that is received from the first and/or second processor 216, 218. The second directional system 236 directs the second marine vessel 206 to move in a selected direction based on a direction command 237 (FIGS. 17-18) received from the first processor 216 and/or second processor 218. The processor 216 and/or the processor 218 determine the designated path 202 for the combination of vessels 204, 206 through the waterway 210 from the first location 212 to the final or other second location 214. Travel of the combination of vessels 204, 206 along the designated path 202 may be carried out based on a transmission of the designated propulsion commands 229, 231 and/or the designated direction commands 235, 237 to the combination of vessels 204, 206 at one or more incremental or intermediate locations 240 along the waterway 210. In addition to the one or more operating parameter(s) of the marine vessel 204 and/or 206, the memory 222 of the processor 216 and/or the processor 218 can store one or more operating parameter(s) of the second marine vessel 206. In the illustrated example of FIG. 15, although the processor 216 of the first marine vessel 204 determines the designated propulsion commands 229, 231 and designated direction commands 235, 237 which are transmitted to the combination of vessels 204, 206, in another embodiment, the system 200 may be similarly configured such that the second processor 218 on the second marine vessel 206 determines the designated path 202 for the combination of vessels 204, 206, the designated propulsion commands 229, 231, and/or the designated direction commands 235, 237 of the combination of the vessels 204, 206. The second processor 218 can determine these parameters in a similar manner as the processor 216 discussed above. Thus, the first marine vessel 204 and the second marine vessel 206 may include similar on-board systems, each of which can be capable of determining the trip plan for the combination of the vessels 204, 206.

Similar to the embodiments discussed above in regard to FIGS. 11-14, the processor 216 determines the designated path 202 for the combination of vessels 204, 206 through the waterway 210 from the first location 212 to the second location 214, the designated propulsion commands 229, 231, and the designated direction commands 235, 237 to be transmitted to the vessels 204, 206 at the one or more incremental or intermediate locations 240 along the designated path 202, so to optimize a performance characteristic of the vessels 204, 206. As discussed in connection with FIGS. 11-14, the optimization of the performance characteristic of the vessels 204, 206 along the designated path 202 can include an optimization of fuel efficiency of the vessels 204, 206 along the designated path 202, an optimization of an energy efficiency of the vessels 204, 206 along the designated path 202, an optimization of a transit time of the vessels 204, 206 along the designated path 202, and/or a waypoint arrival time at one or more incremental or intermediate locations 240 of the combination of vessels 204, 206 along the designated path 202, for example. Additionally, as with the embodiments discussed above in regard to FIGS. 11-14, the determination of the designated path 202, the designated propulsion commands 229, 231, and the designated direction commands 235, 237 can be based on the first location, the second location, the one or more operating parameter(s) of the vessels 204, 206, the designated performance characteristic to be optimized, and/or the navigational data, using the one or more of the methods described above.

Figure 19:
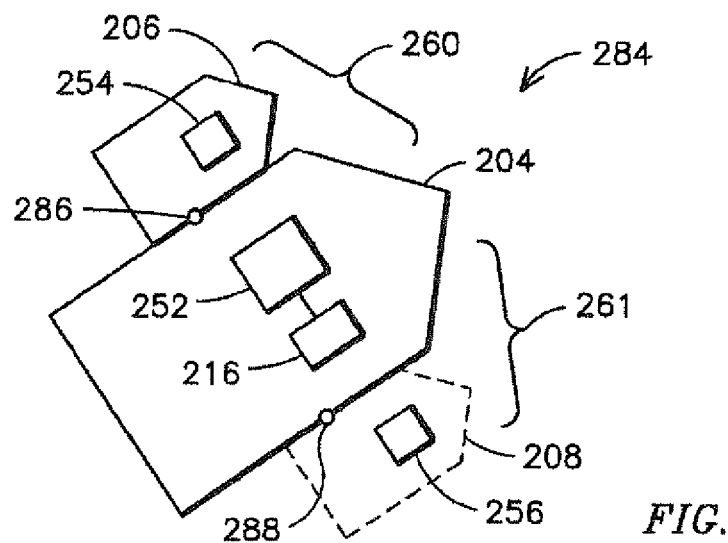
FIG. 19 illustrates a top schematic view of an example embodiment of a combination of a marine vessel including a master controller, and a pair of secondary vessels utilized within a system for optimizing a path for the combination of the marine vessel and the pair of secondary vehicles.

FIG. 19 illustrates an example embodiment of the marine vessel 204 and two second marine vessels 206, 208 which are coupled to the marine vessel 204. The processor 216 is positioned on the marine vessel 204. The processor 216 can determine a spatial arrangement 284 of the second marine vessels 206, 208, with respect to the marine vessel 204. The spatial arrangement 284 may include or represent a designated attachment location 286, 288 for each, or one or more, of the second marine vessels 206, 208 to the marine vessel 204. The determination of the spatial arrangement 284 and the attachment locations 286, 288 can be based on one or more of the operating parameter(s) of the marine vessel 204, 206, and/or 208, the operating parameter(s) of the marine vessels 204, 206, and/or 208, the navigational data, the first location 212, and/or the second location 214.

The spatial arrangement 284 may represent or include how far apart the marine vessels 204, 206, 208 are spaced from each other. For example, although the illustrated embodiment shows the marine vessels 206, 208 directly coupled (e.g., engaged) to the marine vessel 204, alternatively, one or more of the marine vessels 206, 208 may be separated from the marine vessel 204 by a gap. Additionally, the arrangement 284 may include one or more of the marine vessels 204, 206, 208 traveling ahead or behind the other marine vessels 204, 206, 208 along the designated path 202. The spatial arrangement 284 may be based on a size (e.g., width) of the marine vessels 204, 206, 208 and a size (e.g., width) of the waterway 210 at one or more locations. For example, if the waterway 210 is too narrow for the marine vessels 204, 206, 208 to travel side-by-side as shown in FIG. 19, or if the drag on the side-by-side arrangement of the marine vessels 204, 206, 208 would increase fuel consumed by the marine vessels 204, 206, 208, the trip plan may be created or modified to change the arrangement so that one or more of the vessels 204, 206, 208 travels ahead or behind one or more other vessels 204, 206, 208.

As discussed above with regard to FIG. 19, the processor 216 is positioned on the marine vessel 204, and thus the marine vessel 204 may be designated as a master vessel, since it houses the processor 216 which determines the designated path 202, designated propulsion commands 229, 231, and/or designated direction commands 235, 237 in one embodiment. Additionally, the processor 216 which is positioned on the master vessel 204 may be referred to as the master processor. In this embodiment, the second marine vessels 206, 208 may be designated as slave vessels, as the marine vessels 206, 208 may not house the processor 216 which determines the designated path 202, designated propulsion commands 229, 231, and/or the designated direction commands 235, 237. However, as discussed above in regard to the second marine vessel 206 of FIG. 15, one or more of the secondary marine vessels 206, 208 may include a processor which is capable of determining the designated path 202, the designated propulsion commands 229, 231, and/or the designated direction commands 235, 237 for the combination of vessels 204, 206, 208. Thus, the designation of the master vessel among the vessels 204, 206, 208 may change and is not limited to any one of the vessels 204, 206, 208, as each of the marine vessel 204 and the second marine vessels 206, 208 may include a similar on-board system which is capable of determining the designated path 202, the designated propulsion commands 229, 231, and/or the designated direction commands 235, 237. The transceiver 252 is positioned on the marine vessel 204 (or master vessel) and the transceivers 254, 256 are respectively positioned on the secondary marine vessels 206, 208 (or slave vessels), so to establish respective communication links 260, 261 between the marine vessel 204 and the marine vessel 206 and between the marine vessel 204 and the marine vessel 208. Additionally, although FIG. 19 illustrates two marine vessels coupled to the master marine vessel, a different number of marine vessels may be coupled with the master marine vessel. In an example embodiment, the respective processor within the designated slave vessels 206, 208 may receive the propulsion and direction commands for the slave vessels 206, 208 from the master processor 216 of the designated master vessel 204, and may execute these received propulsion and direction commands on the respective slave vessel 206, 208, for example. Thus, in one embodiment, the respective processor within the designated slave vessels 206, 208 is configured to control the respective propulsion and direction system of the slave vessels 206, 208, for example.

Referring back to FIG. 15, as with the embodiments discussed above with regard to FIGS. 11-14, a position determination device 266 can be positioned on the secondary marine vessel 206 (or slave vessel) to measure a position of the secondary marine vessel 206. The position determination device 266 is coupled to the transceiver 254 to communicate the measured position of the secondary marine vessel 206 over the communication link 260 to the processor 216 on the marine vessel 204 (or master vessel). The trip plan of the combination of vessels 204, 206 can include a designated position of the secondary marine vessel 206 along the designated at one or more designated times and/or distances along the designated path. At one or more incremental or intermediate locations 240, the processor 216 can receive the measured position of the second marine vessel 206 from the communication link 260 and compare the measured position with the designated position of the second marine vessel 206 at the location 240. Although FIG. 15 only illustrates a single secondary marine vessel 206, the second marine vessels 206, 208 may be attached to the marine vessel 204, and the second marine vessel 208 would be handled similarly to the second marine vessel 206, as discussed herein. As with the embodiments discussed above with regard to FIGS. 11-14, if the processor 216 determines that the measured position of the second marine vessel 206 varies with the designated position of the second marine vessel 206 by less than a stored predetermined threshold distance, then the processor 216 can transmit a corrective propulsion command and/or a corrective direction command to the second marine vessel 206 over the communication link 260 so that the second marine vessel 206 is propelled toward the designated path 202. However, if the processor 216 determines that the measured position of the second marine vessel 206 varies with the designated position of the second marine vessel 206 by greater than the predetermined threshold distance, then the processor 216 may determine a substitute designated path (not shown) for the combination of vessels 204, 206 through the waterway 210 from the measured position to the final location 214. Additionally, the processor 216 may determine a substitute designated propulsion command and a substitute designated direction command of the combination of vessels 204, 206 at one or more locations along the substitute designated path. The determination of the substitute designated path, the substitute designated propulsion command, and/or the substitute designated direction command can be based on the measured position, the final location, the one or more operating parameter(s) of the marine vessel 204, the one or more operating parameter(s) of the second marine vessel 206, the performance characteristic to be optimized, and/or the navigational data.

Figure 20:
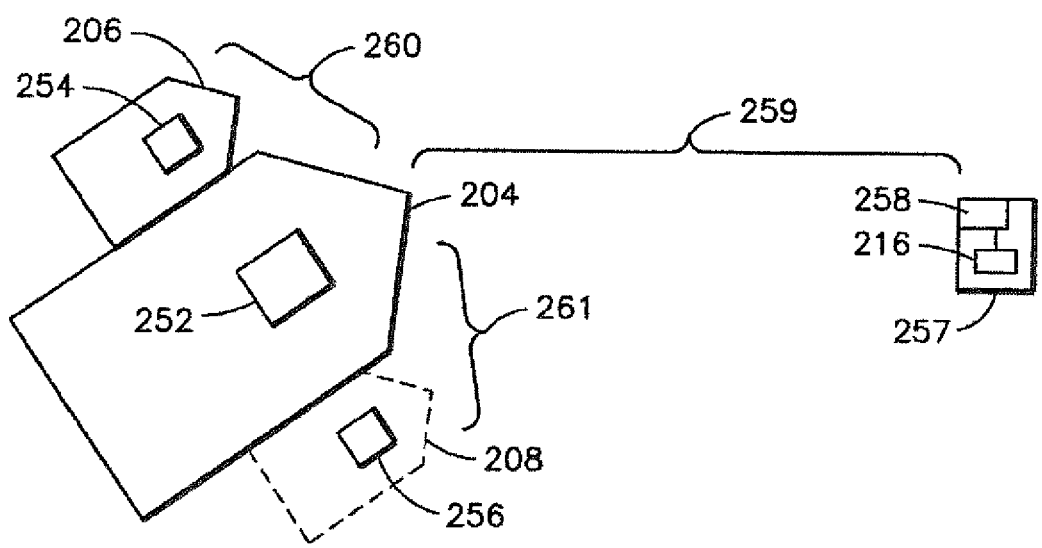
FIG. 20 illustrates a top schematic view of an example embodiment of a combination of a marine vessel and a pair of secondary vessels, where the combination is in wireless communication with a master controller, and is utilized within a system for optimizing a path for the combination of the marine vessel and the pair of secondary vehicles.

FIG. 20 illustrates an arrangement of the combination of vessels 204, 206, 208 similar to FIG. 19, with the exception that the processor 216 is located on the remote station 257, and thus all of the vessels 204, 206, 208 may be referred to as slave vessels, since none of the vessels house the processor 216 which determines the designated path 202. The processor 216 establishes a communication link 259 with the transceiver 252 of the marine vessel 204, which in-turn establishes a respective communication link 260, 261 with the respective transceivers 254, 256 of the vessels 206, 208. Thus, the designated path 202 is determined by the processor 216, as discussed above, and the processor 216 communicates the designated propulsion commands and designated direction commands for the vessels 204, 206, 208 at one or more locations 240 along the waterway 210 over the communication links 259, 260, 261.

Figure 21:
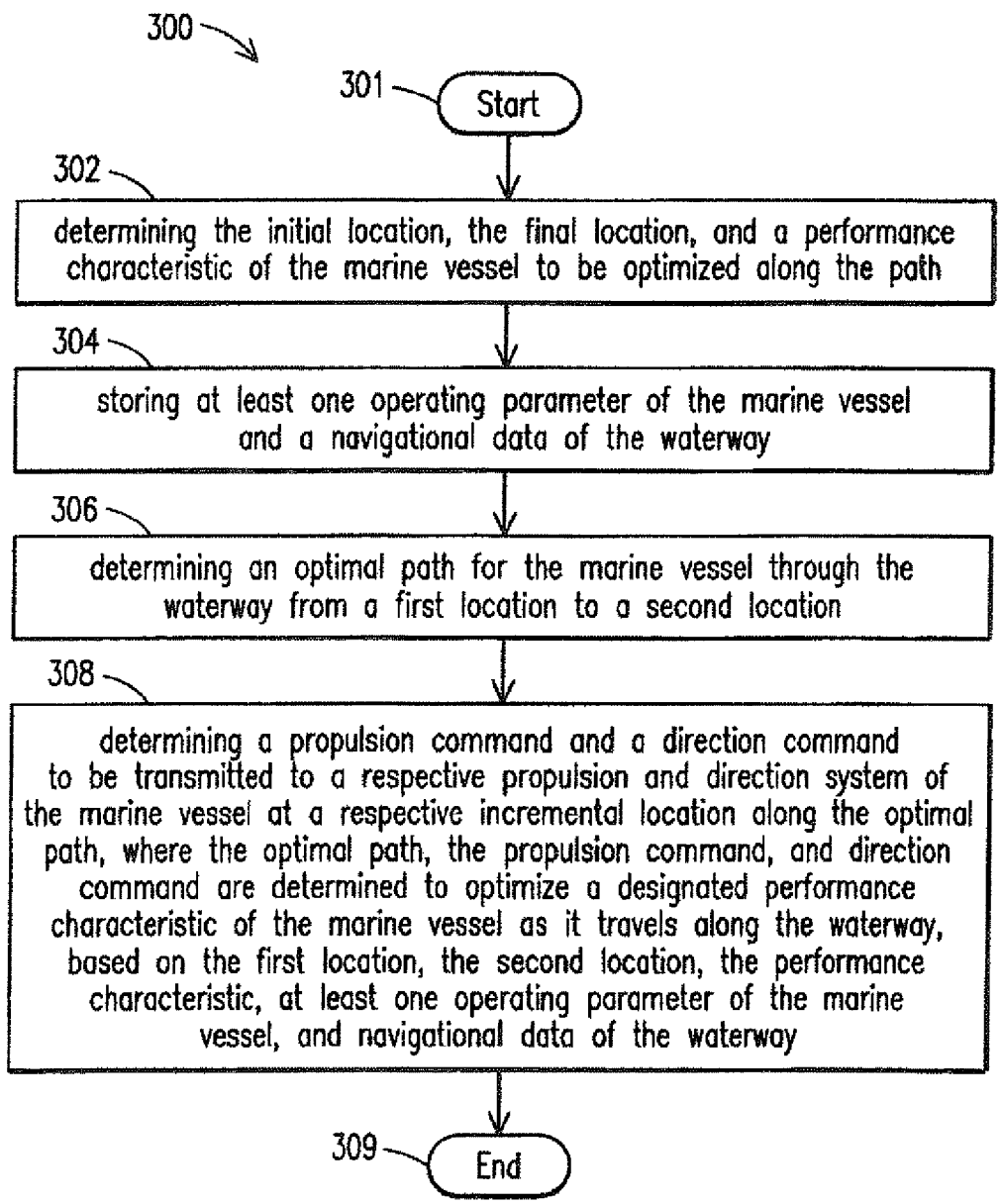
FIG. 21 illustrates a flowchart illustrating an example embodiment of a method for controlling a marine vessel.

FIG. 21 illustrates a flowchart depicting a method 300 for determining a trip plan for moving the marine vessel 204 through the waterway 210 from the first location 212 to the second location 214. The method 300 includes, at 301, determining 302 the first location 212, the second location 214, and a performance characteristic of the marine vessel 204 to be optimized along the path. The method 300 further includes storing 304 at least one operating parameter of the marine vessel 204 and a navigational data of the waterway 210. The method 300 further includes determining 306 a designated path 202 for the marine vessel 204 through the waterway 210 from the first location 212 to the second location 214. The method 300 further includes determining 308 a designated propulsion command 229 and a designated direction command 235 to be transmitted to a respective propulsion and directional system 228, 234 of the marine vessel 204 at one or more locations 240 along the designated path 202. The method 300 may end at 309 or return to one or more previously described operations so as to proceed in a loop-wise manner. The determining 306, 308 of the designated path, the designated propulsion command, and the designated direction command may be based on the first location 212, the second location 214, the performance characteristic, the at least one operating parameter, and/or the navigational data.

In one embodiment, the method 300 disclosed in the flowchart transforms the marine vessel 204, which previously did not travel along the designated path 202, to travel along the designated path 202 from the first location 212 to the second location 214. Furthermore, the marine vessel 204 disclosed herein is a particular machine, not a general purpose machine, and thus the method 300 is tied to a particular machine.

Another embodiment relates to a method for controlling operations of a marine vessel (or combination of marine vessels) along a waterway. According to the method, the marine vessel is controlled based on an optimized or designated mission plan, typically for reducing fuel use, reducing emissions output, or optimizing some other performance characteristic of the marine vessel. For calculating the mission plan, which includes a designated path for the marine vessel along the waterway, navigational data and marine vessel operating parameters are received, e.g., from a database or otherwise. The navigational data includes data relating to one or more characteristics of a waterway on which the marine vessel is to travel, including, possibly, data relating to at least one speed limit along the waterway. The mission plan is created on-board the marine vessel at any time during travel of the marine vessel along the waterway. The mission plan is created at a first point along the waterway based on the received data, and covers at least a segment of the waterway extending to a second point further along the waterway than the first point. The mission plan is created based on the received data, the first and second points, and the performance characteristic of the marine vessel to be optimized, using the optimization computational methods described in detail above. The mission plan is created for covering the entirety of the segment based on, and regardless of, all the different hydrographic or geographic features or other characteristics of the waterway along the segment for which data is available. By this, it is meant: (i) the mission plan takes into consideration all the different geographic or hydrographic features or other characteristics of the route segment for which data is available, and (ii) the mission plan is created regardless of what particular geographic or hydrographic features or other characteristics of the waterway are along the segment. Thus, no matter what known geographic or hydro graphic features or other waterway characteristics are along a segment, a mission plan is created for that segment. The method further comprises controlling the marine vessel according to the mission plan as the marine vessel travels along the waterway.

In another embodiment, a system (e.g., a system for controlling a marine vessel) includes a processor, a propulsion system, and a directional system. The processor is configured to be disposed onboard a marine vessel and to obtain a trip plan that includes designated operational settings of the marine vessel for a trip along a waterway. The propulsion system of the marine vessel is configured to be communicatively coupled with the processor and to generate propulsion to move the marine vessel according to the designated operational settings of the trip plan. The directional system of the marine vessel is configured to be communicatively coupled with the processor and to steer the marine vessel according to the designated operational settings of the trip plan. The propulsion system propelling the marine vessel and the directional system steering the marine vessel according to the designated operational settings of the trip plan reduces at least one of fuel consumed or emissions generated by the marine vessel relative to the marine vessel being propelled or steered according to one or more plans other than the trip plan.

In another aspect, the processor is configured to monitor actual operational conditions of the marine vessel as the marine vessel travels along the waterway and to compare the actual operational conditions to the designated operational settings of the trip plan. The processor also is configured to modify the trip plan into a modified trip plan when a difference between one or more of the actual operational conditions and the designated operational settings exceeds a designated threshold.

In another aspect, the trip plan includes a designated path for the marine vessel to travel along in the waterway. The processor is configured to modify the trip plan into the modified trip plan when movement of the marine vessel deviates from the designated path by more than a threshold distance.

In another aspect, the processor is configured to monitor at least one of a direction of water current flow in the waterway, a speed of the water current flow, a direction of wind movement, or a speed of the wind movement along a portion of a designated path of the trip plan.

In another aspect, the processor is configured to at least one of generate or modify the trip plan when at least one of the direction of water current flow, the speed of the water current flow, the direction of wind movement, or the speed of the wind movement exceeds a designated threshold.

In another aspect, the processor is configured to generate the trip plan such that the marine vessel travels in a common direction as the at least one of the direction of water current flow or the direction of wind movement for at least a portion of a designated path of the trip plan when one or more of the speed of the water current flow or the speed of the wind movement exceeds a designated threshold.

In another aspect, the processor is configured to periodically compare an actual location of the marine vessel with a designated location of the trip plan and to modify the trip plan when a difference between the actual location and the designated location exceeds a designated threshold. A frequency at which the processor periodically compares the actual location to the designated location is based on the at least one of the direction of water current flow, the speed of the water current flow, the direction of wind movement, or the speed of the wind movement.

In another aspect, the processor is configured to switch to an emergency mode upon occurrence of one or more detected emergency events and to change the trip plan to direct the propulsion system and the directional system to guide the marine vessel to a designated location.

In another aspect, the processor is configured to determine the designated location to which the marine vessel travels in the emergency mode based on a current location of the marine vessel.

In another aspect, the processor is configured to transfer control of the propulsion system and the directional system to a remote facility when the marine vessel travels within a designated range of a docking location. The propulsion system and the directional system are configured to be controlled by the remote facility to dock the marine vessel at the docking location.

In another aspect, the processor is configured to receive a docking plan when the marine vessel travels within a designated range of a docking location. The docking plan includes designated operational settings of the marine vessel for controlling the propulsion system and the directional system to dock the marine vessel at the docking location.

In another aspect, the processor is configured to autonomously control the propulsion system and the directional system according to the docking plan.

In another aspect, the designated operational settings of the docking plan are based on a time of arrival of the marine vessel at the docking location when space is available for the marine vessel to dock at the docking location.

In another aspect, the processor is configured to communicate control signals to an output device disposed onboard the marine vessel to present an operator of the marine vessel with instructions on how to manually control the marine vessel according to the designated operational settings.

In another embodiment, another method (e.g., for controlling a marine vessel) is provided. The method includes obtaining a trip plan that includes designated operational settings of a marine vessel for a trip along a waterway, controlling a propulsion system of the marine vessel to generate propulsion to move the marine vessel according to the designated operational settings of the trip plan, and controlling a directional system of the marine vessel to steer the marine vessel according to the designated operational settings of the trip plan. The propulsion system propelling the marine vessel and the directional system steering the marine vessel according to the designated operational settings of the trip plan reduces at least one of fuel consumed or emissions generated by the marine vessel relative to the marine vessel being propelled or steered according to one or more plans other than the trip plan.

In another aspect, the method also includes monitoring actual operational conditions of the marine vessel as the marine vessel travels along the waterway and comparing the actual operational conditions to the designated operational settings of the trip plan. The method may also include modifying the trip plan into a modified trip plan when a difference between one or more of the actual operational conditions and the designated operational settings exceeds a designated threshold.

In another aspect, the trip plan includes a designated path for the marine vessel to travel along in the waterway, and the method includes modifying the trip plan into the modified trip plan occurs when movement of the marine vessel deviates from the designated path by more than a threshold distance.

In another aspect, the method also includes monitoring at least one of a direction of water current flow in the waterway, a speed of the water current flow, a direction of wind movement, or a speed of the wind movement along a portion of a designated path of the trip plan.

In another aspect, the method also includes at least one of generating or modifying the trip plan when at least one of the direction of water current flow, the speed of the water current flow, the direction of wind movement, or the speed of the wind movement exceeds a designated threshold.

In another aspect, obtaining the trip plan includes generating the trip plan such that the marine vessel travels in a common direction as the at least one of the direction of water current flow or the direction of wind movement for at least a portion of a designated path of the trip plan when one or more of the speed of the water current flow or the speed of the wind movement exceeds a designated threshold.

In another aspect, the method also includes periodically comparing an actual location of the marine vessel with a designated location of the trip plan and modifying the trip plan when a difference between the actual location and the designated location exceeds a designated threshold. A frequency at which the processor periodically compares the actual location to the designated location is based on the at least one of the direction of water current flow, the speed of the water current flow, the direction of wind movement, or the speed of the wind movement.

In another aspect, the method also includes changing the trip plan to direct the propulsion system and the directional system to guide the marine vessel to a designated location upon occurrence of one or more detected emergency events.

In another aspect, the method also includes determining the designated location to which the marine vessel travels in the emergency mode based on a current location of the marine vessel.

In another aspect, the method also includes transferring control of the propulsion system and the directional system from onboard the marine vessel to a remote facility when the marine vessel travels within a designated range of a docking location. The propulsion system and the directional system are controlled by the remote facility to dock the marine vessel at the docking location.

In another aspect, the method also includes receiving a docking plan when the marine vessel travels within a designated range of a docking location. The docking plan includes designated operational settings of the marine vessel for controlling the propulsion system and the directional system to dock the marine vessel at the docking location.

In another aspect, the method also includes autonomously controlling the propulsion system and the directional system according to the docking plan.

In another aspect, at least one of controlling the propulsion system or controlling the directional system includes autonomously controlling the propulsion system or the directional system according to the designated operational settings of the trip plan.

In another aspect, at least one of controlling the propulsion system or controlling the directional system includes presenting instructions to an operator of the marine vessel, the instructions representative of the designated operational settings of the trip plan so that the operator can manually control at least one of the propulsion system or the directional system according to the designated operational settings of the trip plan.

In another embodiment, another system (e.g., for controlling a marine vessel combination of a first marine vessel and a second marine vessel) includes a processor. The processor is configured to be disposed onboard the marine vessel combination of the first marine vessel that is coupled with the second marine vessel. The processor is configured to determine a trip plan for the marine vessel combination that includes a designated path for the marine vessel combination through a waterway and designated operational settings of the marine vessel combination expressed as a function of at least one of time or distance along the path. The designated path and the designated operational settings are determined by the processor to at least one of reduce fuel consumed, reduce emissions generated, increase energy efficiency, reduce a transit time, or decrease an arrival time at one or more locations along the designated path by the marine vessel combination relative to traveling along the waterway according to one or more plans other than the trip plan.

In another aspect, the designated path and the designated operational settings are based on a starting or current location of the marine vessel combination, a destination location of the marine vessel combination, at least one operating parameter of the marine vessel combination, and navigational data representative of characteristics of the waterway.

In another aspect, the processor is configured to generate control signals based on the designated operational settings of the trip plan and to communicate the control signals to at least one of a propulsion system or a directional system of the combination of marine vessels to autonomously control the at least one of the propulsion system or the directional system according to the trip plan.

In another aspect, the processor is configured to generate control signals based on the designated operational settings of the trip plan and to communicate the control signals to an output device in order to display instructions to an operator of the combination of marine vessels so that the operator manually controls at least one of a propulsion system or a directional system of the combination of marine vessels according to the trip plan.

While the present inventive subject matter has been described with reference to various exemplary embodiments, it will be understood by one of ordinary skill in the art that various changes, omissions and/or additions may be made and equivalents may be substituted for elements thereof without departing from the spirit and scope of the inventive subject matter. Therefore, it is intended that the inventive subject matter not be limited to the particular embodiment disclosed as the best mode contemplated for carrying out this inventive subject matter, but that the inventive subject matter will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A system comprising:
a processor configured to be disposed onboard a marine vessel, the processor also configured to obtain a trip plan that includes designated operational settings of the marine vessel for a trip along a waterway;
a propulsion system of the marine vessel that is configured to be communicatively coupled with the processor, the propulsion system configured to generate propulsion to move the marine vessel according to the designated operational settings of the trip plan; and
a directional system of the marine vessel that is configured to be communicatively coupled with the processor, the directional system configured to steer the marine vessel according to the designated operational settings of the trip plan, wherein the propulsion system propelling the marine vessel and the directional system steering the marine vessel according to the designated operational settings of the trip plan reduces at least one of fuel consumed or emissions generated by the marine vessel relative to the marine vessel being propelled or steered according to one or more plans other than the trip plan,
wherein the processor is configured to monitor at least one of a direction of water current flow in the waterway, a speed of the water current flow, a direction of wind movement, or a speed of the wind movement along a portion of a designated path of the trip plan, and
wherein the one or more processors are configured to generate the trip plan such that the marine vessel travels in a common direction as the at least one of the direction of water current flow or the direction of wind movement for at least a portion of a designated path of the trip plan when one or more of the speed of the water current flow or the speed of the wind movement exceeds a designated threshold.

2. The system of claim 1, wherein the processor is configured to monitor actual operational conditions of the marine vessel as the marine vessel travels along the waterway and to compare the actual operational conditions to the designated operational settings of the trip plan, the processor also configured to modify the trip plan into a modified trip plan when a difference between one or more of the actual operational conditions and the designated operational settings exceeds a designated threshold.

3. The system of claim 2, wherein the processor is configured to modify the trip plan into the modified trip plan when movement of the marine vessel deviates from the designated path by more than a threshold distance.

4. The system of claim 1, wherein the processor is configured to at least one of generate or modify the trip plan when at least one of the direction of water current flow, the speed of the water current flow, the direction of wind movement, or the speed of the wind movement exceeds a designated threshold.

5. The system of claim 1, wherein the processor is configured to periodically compare an actual location of the marine vessel with a designated location of the trip plan and to modify the trip plan when a difference between the actual location and the designated location exceeds a designated threshold, further wherein a frequency at which the processor periodically compares the actual location to the designated location is based on the at least one of the direction of water current flow, the speed of the water current flow, the direction of wind movement, or the speed of the wind movement.

6. The system of claim 1, wherein the processor is configured to switch to an emergency mode upon occurrence of one or more detected emergency events, the processor configured to change the trip plan to direct the propulsion system and the directional system to guide the marine vessel to a designated location.

7. The system of claim 6, wherein the processor is configured to determine the designated location to which the marine vessel travels in the emergency mode based on a current location of the marine vessel.

8. The system of claim 1, wherein the processor is configured to transfer control of the propulsion system and the directional system to a remote facility when the marine vessel travels within a designated range of a docking location, and the propulsion system and the directional system are configured to be controlled by the remote facility to dock the marine vessel at the docking location.

9. The system of claim 1, wherein the processor is configured to receive a docking plan when the marine vessel travels within a designated range of a docking location, the docking plan including designated operational settings of the marine vessel for controlling the propulsion system and the directional system to dock the marine vessel at the docking location.

10. The system of claim 9, wherein the processor is configured to autonomously control the propulsion system and the directional system according to the docking plan.

11. The system of claim 9, wherein the designated operational settings of the docking plan are based on a time of arrival of the marine vessel at the docking location when space is available for the marine vessel to dock at the docking location.

12. The system of claim 1, wherein the processor is configured to communicate control signals to an output device disposed onboard the marine vessel to present an operator of the marine vessel with instructions on how to manually control the marine vessel according to the designated operational settings.

13. A method comprising:
obtaining a trip plan that includes designated operational settings of a marine vessel for a trip along a waterway;
monitoring at least one of a direction of water current flow in the waterway, a speed of the water current flow, a direction of wind movement, or a speed of the wind movement along a portion of a designated path of the trip plan;
controlling a propulsion system of the marine vessel to generate propulsion to move the marine vessel according to the designated operational settings of the trip plan; and
controlling a directional system of the marine vessel to steer the marine vessel according to the designated operational settings of the trip plan, wherein the propulsion system propelling the marine vessel and the directional system steering the marine vessel according to the designated operational settings of the trip plan reduces at least one of fuel consumed or emissions generated by the marine vessel relative to the marine vessel being propelled or steered according to one or more plans other than the trip plan,
wherein obtaining the trip plan includes generating the trip plan such that the marine vessel travels in a common direction as the at least one of the direction of water current flow or the direction of wind movement for at least a portion of a designated path of the trip plan when one or more of the speed of the water current flow or the speed of the wind movement exceeds a designated threshold.

14. The method of claim 13, further comprising:
monitoring actual operational conditions of the marine vessel as the marine vessel travels along the waterway;
comparing the actual operational conditions to the designated operational settings of the trip plan; and
modifying the trip plan into a modified trip plan when a difference between one or more of the actual operational conditions and the designated operational settings exceeds a designated threshold.

15. The method of claim 14, wherein modifying the trip plan into the modified trip plan occurs when movement of the marine vessel deviates from the designated path by more than a threshold distance.

16. The method of claim 13, further comprising at least one of generating or modifying the trip plan when at least one of the direction of water current flow, the speed of the water current flow, the direction of wind movement, or the speed of the wind movement exceeds a designated threshold.

17. The method of claim 13, further comprising:
periodically comparing an actual location of the marine vessel with a designated location of the trip plan; and
modifying the trip plan when a difference between the actual location and the designated location exceeds a designated threshold, further wherein a frequency at which the processor periodically compares the actual location to the designated location is based on the at least one of the direction of water current flow, the speed of the water current flow, the direction of wind movement, or the speed of the wind movement.

18. The method of claim 13, further comprising changing the trip plan to direct the propulsion system and the directional system to guide the marine vessel to a designated location upon occurrence of one or more detected emergency events.

19. The method of claim 18, further comprising determining the designated location to which the marine vessel travels in the emergency mode based on a current location of the marine vessel.

20. The method of claim 13, further comprising transferring control of the propulsion system and the directional system from onboard the marine vessel to a remote facility when the marine vessel travels within a designated range of a docking location, wherein the propulsion system and the directional system are controlled by the remote facility to dock the marine vessel at the docking location.

21. The method of claim 13, further comprising receiving a docking plan when the marine vessel travels within a designated range of a docking location, the docking plan including designated operational settings of the marine vessel for controlling the propulsion system and the directional system to dock the marine vessel at the docking location.

22. The method of claim 21, further comprising autonomously controlling the propulsion system and the directional system according to the docking plan.

23. The method of claim 13, wherein at least one of controlling the propulsion system or controlling the directional system includes autonomously controlling the propulsion system or the directional system according to the designated operational settings of the trip plan.

24. The method of claim 13, wherein at least one of controlling the propulsion system or controlling the directional system includes presenting instructions to an operator of the marine vessel, the instructions representative of the designated operational settings of the trip plan so that the operator can manually control at least one of the propulsion system or the directional system according to the designated operational settings of the trip plan.

25. A system comprising:
- a processor configured to be disposed onboard a marine vessel, the processor also configured to obtain a trip plan that includes designated operational settings of the marine vessel for a trip along a waterway;
- a propulsion system of the marine vessel that is configured to be communicatively coupled with the processor, the propulsion system configured to generate propulsion to move the marine vessel according to the designated operational settings of the trip plan; and
- a directional system of the marine vessel that is configured to be communicatively coupled with the processor, the directional system configured to steer the marine vessel according to the designated operational settings of the trip plan, wherein the propulsion system propelling the marine vessel and the directional system steering the marine vessel according to the designated operational settings of the trip plan reduces at least one of fuel consumed or emissions generated by the marine vessel relative to the marine vessel being propelled or steered according to one or more plans other than the trip plan,
- wherein the processor is configured to monitor at least one of a direction of water current flow in the waterway, a speed of the water current flow, a direction of wind movement, or a speed of the wind movement along a portion of a designated path of the trip plan, and
- wherein the processor is configured to periodically compare an actual location of the marine vessel with a designated location of the trip plan and to modify the trip plan when a difference between the actual location and the designated location exceeds a designated threshold, further wherein a frequency at which the processor periodically compares the actual location to the designated location is based on the at least one of the direction of water current flow, the speed of the water current flow, the direction of wind movement, or the speed of the wind movement.

26. A method comprising:
- obtaining a trip plan that includes designated operational settings of a marine vessel for a trip along a waterway;
- monitoring at least one of a direction of water current flow in the waterway, a speed of the water current flow, a direction of wind movement, or a speed of the wind movement along a portion of a designated path of the trip plan;
- controlling a propulsion system of the marine vessel to generate propulsion to move the marine vessel according to the designated operational settings of the trip plan;
- controlling a directional system of the marine vessel to steer the marine vessel according to the designated operational settings of the trip plan, wherein the propulsion system propelling the marine vessel and the directional system steering the marine vessel according to the designated operational settings of the trip plan reduces at least one of fuel consumed or emissions generated by the marine vessel relative to the marine vessel being propelled or steered according to one or more plans other than the trip plan;
- periodically comparing an actual location of the marine vessel with a designated location of the trip plan; and
- modifying the trip plan when a difference between the actual location and the designated location exceeds a designated threshold, further wherein a frequency at which the processor periodically compares the actual location to the designated location is based on the at least one of the direction of water current flow, the speed of the water current flow, the direction of wind movement, or the speed of the wind movement.

* * * * *